(12) United States Patent
Merrow et al.

(10) Patent No.: US 8,631,698 B2
(45) Date of Patent: Jan. 21, 2014

(54) TEST SLOT CARRIERS

(75) Inventors: Brian S. Merrow, Harvard, MA (US);
Valquirio N. Carvalho, Lowell, MA (US); John P. Toscano, Auburn, MA (US)

(73) Assignee: Teradyne, Inc., North Reading, MA (US)

( * ) Notice: Subject to any disclaimer, the term of this patent is extended or adjusted under 35 U.S.C. 154(b) by 745 days.

(21) Appl. No.: 12/698,605

(22) Filed: Feb. 2, 2010

(65) Prior Publication Data

US 2011/0185811 A1  Aug. 4, 2011

(51) Int. Cl.
*G01D 11/24* (2006.01)
*G01L 19/14* (2006.01)
*G11B 27/36* (2006.01)
*H05K 5/00* (2006.01)

(52) U.S. Cl.
USPC ............... 73/431; 454/184; 360/31; 414/806

(58) Field of Classification Search
USPC ............... 73/431; 360/31; 454/184; 414/806
See application file for complete search history.

(56) References Cited

U.S. PATENT DOCUMENTS

| 7,483,269 | B1 | 1/2009 | Marvin, Jr. et al. |
| 7,911,778 | B2 * | 3/2011 | Merrow .................. 361/679.37 |
| 8,041,449 | B2 * | 10/2011 | Noble et al. .................. 700/213 |
| 2006/0077776 | A1 * | 4/2006 | Matsushima et al. ...... 369/30.27 |
| 2009/0153992 | A1 * | 6/2009 | Garcia et al. .................... 360/31 |

FOREIGN PATENT DOCUMENTS

| WO | 2009/129096 | 10/2009 | ............. G01R 31/02 |
| WO | WO 2009129096 A2 * | 10/2009 | ............. G11B 19/04 |

OTHER PUBLICATIONS

International Search Report and Written Opinion of the International Searching Authority for International Application No. PCT/US2011/023343 dated Oct. 28, 2011.

* cited by examiner

*Primary Examiner* — Lisa Caputo
*Assistant Examiner* — Jamel Williams
(74) *Attorney, Agent, or Firm* — Fish & Richardson P.C.

(57) ABSTRACT

A test rack for a storage device testing system includes a plurality of test slot carriers. Each of the test slot carriers includes a plurality of test slot assemblies. The test slot assemblies are configured to received and support storage devices for testing. The test rack also includes a chassis. The chassis includes a plurality of carrier receptacles for releasable receiving and supporting the test slot carriers. The test slot carriers are interchangeable with each other among the various carrier receptacles.

26 Claims, 27 Drawing Sheets

TEST SLOT CARRIERS

TECHNICAL FIELD

This disclosure relates to test slot carriers and related devices, systems, and methods.

BACKGROUND

Storage device manufacturers typically test manufactured storage devices for compliance with a collection of requirements. Test equipment and techniques exist for testing large numbers of storage devices serially or in parallel. Manufacturers tend to test large numbers of storage devices simultaneously or in batches. Storage device testing systems typically include one or more tester racks having multiple test slots that receive storage devices for testing. In some cases, the storage devices are placed in carriers which are used for loading and unloading the storage devices to and from the test racks.

The testing environment immediately around the storage device is regulated. Minimum temperature fluctuations in the testing environment may be critical for accurate test conditions and for safety of the storage devices. in addition, the latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repetitive run-out (NRRO), which may result in lower yields and increased manufacturing costs. Current disk drive testing systems employ automation and structural support systems that contribute to excess vibrations in the system and/or require large footprints.

SUMMARY

In general, this disclosure relates to test slot carriers, and related devices, systems, and methods.

In one aspect, a test rack for a storage device testing system includes a plurality of test slot carriers. Each of the test slot carriers includes a plurality of test slot assemblies. The test slot assemblies are configured to receive and support storage devices for testing. The test rack also includes a chassis. The chassis includes a plurality of carrier receptacles for releasable receiving and supporting the test slot carriers. The test slot carriers are interchangeable with each other among the various carrier receptacles.

Embodiments may include one or more of the following features.

In some cases, the test rack infrastructure for setting and maintaining temperatures is not dependent upon a test slot pitch or a test slot type associated with the respective test slot carriers.

In some embodiments, the test rack can also include test electronics configured to communicate one or more test routines to storage devices disposed within the test slot assemblies. The test slot assemblies can include connection interface boards configured to provide electrical communication between storage devices disposed within the test slot assemblies and the test electronics.

In some cases, the test slot assemblies are each supported in an associated one of the test slot carriers via isolators. The isolators can be arranged to inhibit transmission of vibrational energy between the test slot assemblies and the associated one of the test slot carriers.

In some embodiments, the plurality of test slot carriers includes a first test slot carrier and a second test slot carrier. The first test slot carrier includes a first plurality of test slot assemblies, and the second test slot carrier includes a second plurality of test slot assemblies. The first plurality of test slot assemblies are configured to test a first type of storage device (e.g., a 7 mm disk drive, a 9.5 mm disk drive, a 12 mm disk drive, or a 15 mm disk drive), and the second plurality of test slot assemblies are configured to test a second type of storage device (e.g., a 7 mm disk drive, a 9.5 mm disk drive, a 12 mm disk drive, or a 15 mm disk drive) that is different from the first type of storage device. It is also possible to mix slot types within a test slot carrier.

Test slots can also be configured to different types of storage devices. For example, test slots configured to test taller disk drives can also be used to test smaller disk drives.

Each of the test slot assemblies can include an air mover assembly arranged to convey an air flow through the associated test slot assembly. The air mover assemblies can each be supported in an associated one of the test slot carriers via isolators. The isolators can be arranged to inhibit transmission of vibrational energy between the air mover assemblies and the associated one of the test slot carriers.

In some cases, each of the test slot carriers includes at least one air mover assembly that is arranged to convey an air flow through at least one of the associated test slot assemblies.

In some embodiments, at least one of the test slot assemblies is configured to test different types of storage devices. For example, in some embodiments, at least one of the test slot assemblies is configured to test two or more types of storage devices selected from the group consisting of a 7 mm disk drive, a 9.5 mm disk drive, a 12 mm disk drive, and a 15 mm disk drive.

In another aspect, a test slot carrier comprises a body and a plurality of test slot assemblies supported by the body, the test slot assemblies being configured to receive and support storage devices for testing. The test slot carrier also includes a plurality of first isolators arranged to inhibit transmission of vibrational energy between the test slot assemblies and the body.

Embodiments may include one or more of the following features.

In some embodiments, each of the test slot assemblies includes a storage device transporter that includes a frame configured to receive and support a storage device, and a test slot including a test compartment for receiving and supporting the storage device transporter. In some examples, the test slots also include protrusions which interface with the first isolators for supporting the test slots within the body. In some cases, the carrier body includes protrusions which interface with the first isolators. The test slot carrier can also include an air mover assembly arranged to convey an air flow through at least one of the test compartments of the associated test slots. In some cases, the test slot carrier also includes a plurality of second isolators arranged to inhibit transmission of vibrational energy between the air mover assemblies and the body. The test slot carrier can also include an air mover, and a mounting plate supporting the air mover. The mounting plate can include projections which interface with the second isolators.

In a further aspect, a method includes inserting a first test slot carrier comprising a first plurality of test slots into a carrier receptacle of a test rack; removing the first test slot carrier from the carrier receptacle; and inserting a second test slot carrier comprising a second plurality of test slots into the carrier receptacle.

Embodiments may include one or more of the following features.

The method can also include utilizing one of the first plurality of test slots to perform a functionality test on a first storage device while the first test slot carrier is disposed within the carrier receptacle.

In some embodiments, the method also includes utilizing one of the second plurality of test slots to perform a functionality test on a second storage device while the second test slot carrier is disposed within the carrier receptacle.

In some cases, the method can also include inserting the first test slot carrier into an other carrier receptacle of the test rack.

The method can also include inserting the first test slot carrier into an other carrier receptacle of an other test rack.

In some embodiments, the first plurality of test slot assemblies are configured to test a first type of storage device, and the second plurality of test slot assemblies are configured to test a second type of storage device, different from the first type of storage device.

Embodiments can include one or more of the following advantages.

Different ones of the test slot carriers can be configured to test different types of storage devices, thereby allowing for different types of storage devices to be tested in a single testing system. The test slot carriers are interchangeable with each other within the testing system, thereby allowing for adaptation and/or customization of the testing system based on testing needs. Furthermore, the rack/system infrastructure can be configured in such a manner that the test slot pitch (i.e., the distance from slot-to-slot) and test slot type are not restricted by such things as air ports or heat exchanger adjacency.

DESCRIPTION OF DRAWINGS

Like reference symbols in the various drawings indicate like elements.

DETAILED DESCRIPTION

System Overview

Figure 1:
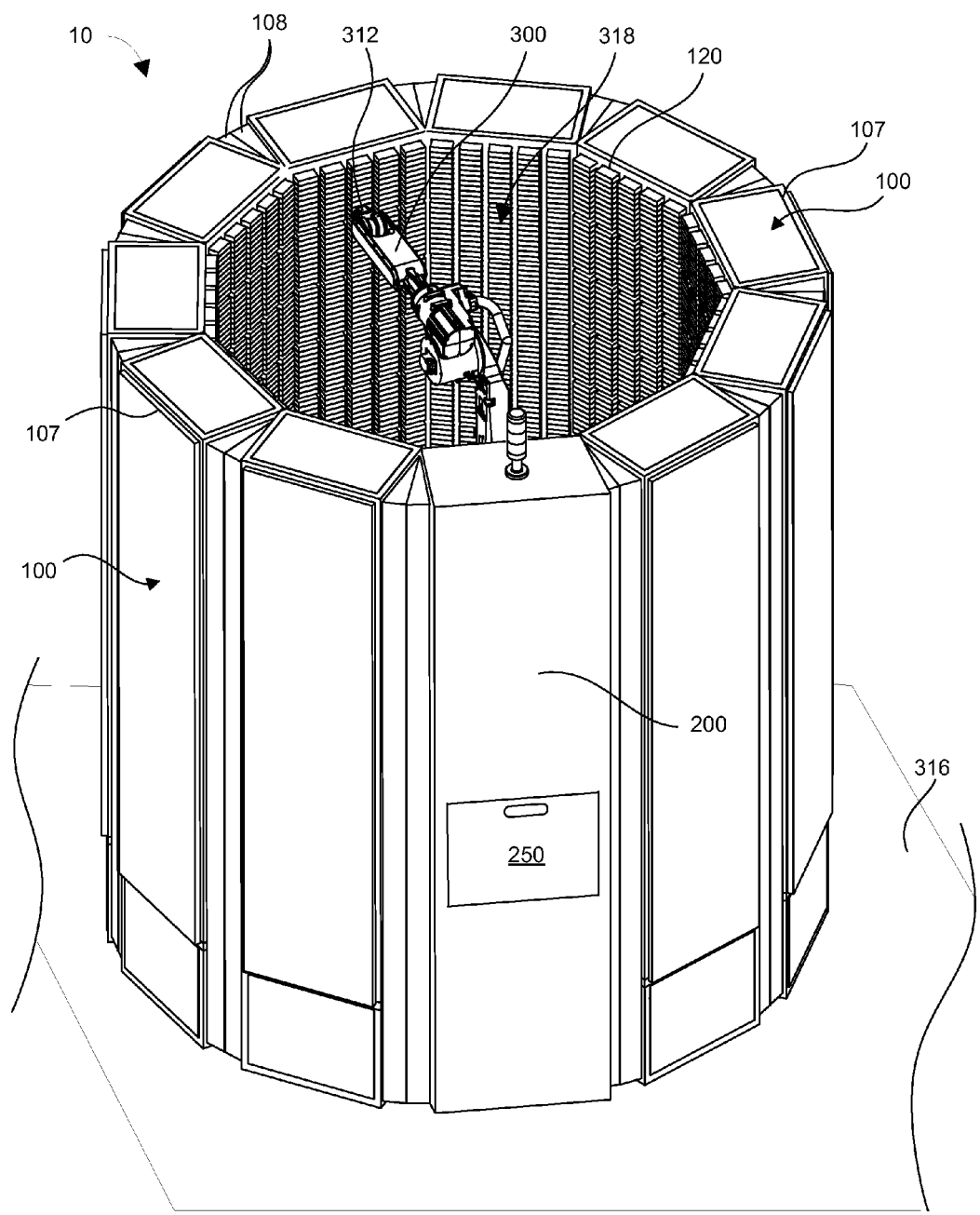
FIG. 1 is a perspective view of a storage device testing system.
Figure 2A:
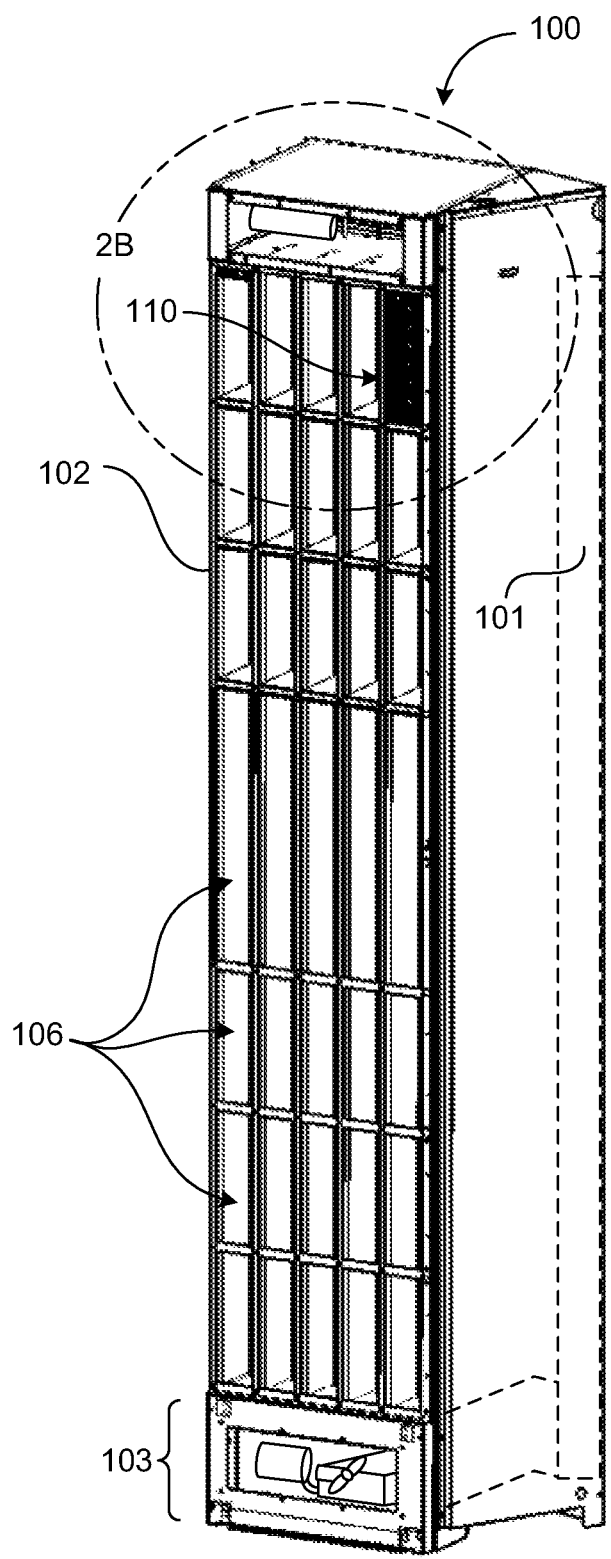
FIG. 2A is perspective view of a test rack.
Figure 2B:
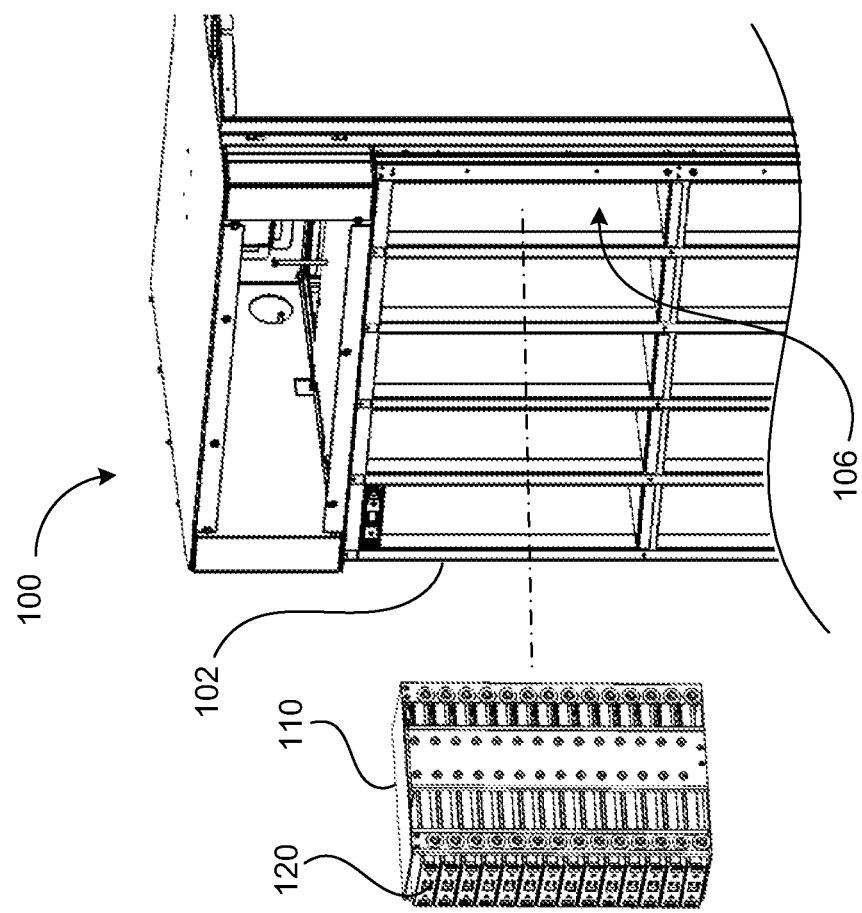
FIG. 2B is a detailed perspective view of a carrier receptacle from the test rack of FIG. 2A.

As shown in FIG. 1, a storage device testing system 10 includes a plurality of test racks 100 (e.g., 10 test racks shown), a transfer station 200, and a robot 300. As shown in FIGS. 2A and 2B, each test rack 100 generally includes a chassis 102. The chassis 102 can be constructed from a plurality of structural members 104 (e.g., formed sheet metal, extruded aluminum, steel tubing, and/or composite members) which are fastened together and together define a plurality of carrier receptacles 106.

Figure 3A:
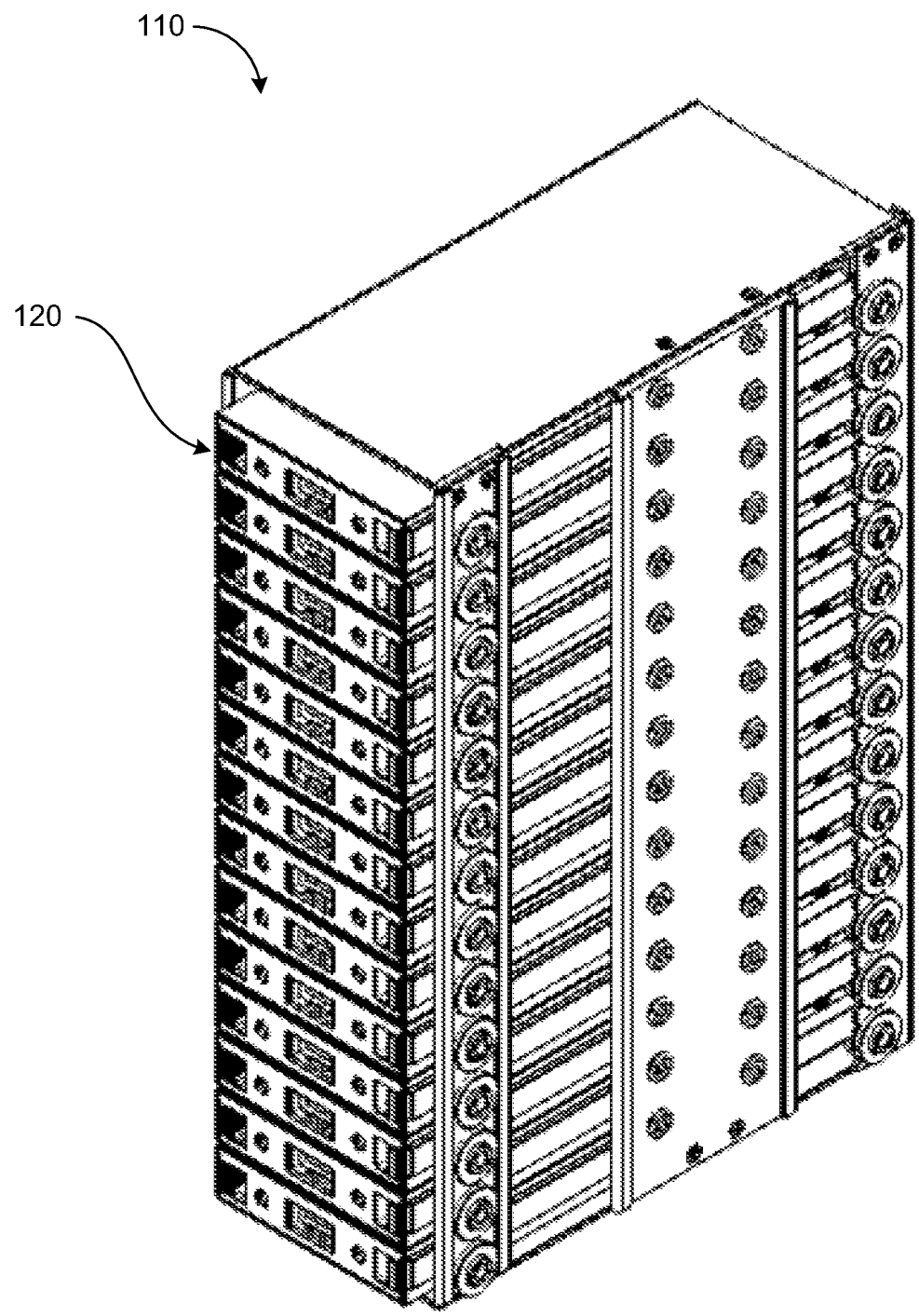
FIGS. 3A and 3B are perspective views of a test slot carrier.
Figure 3B:
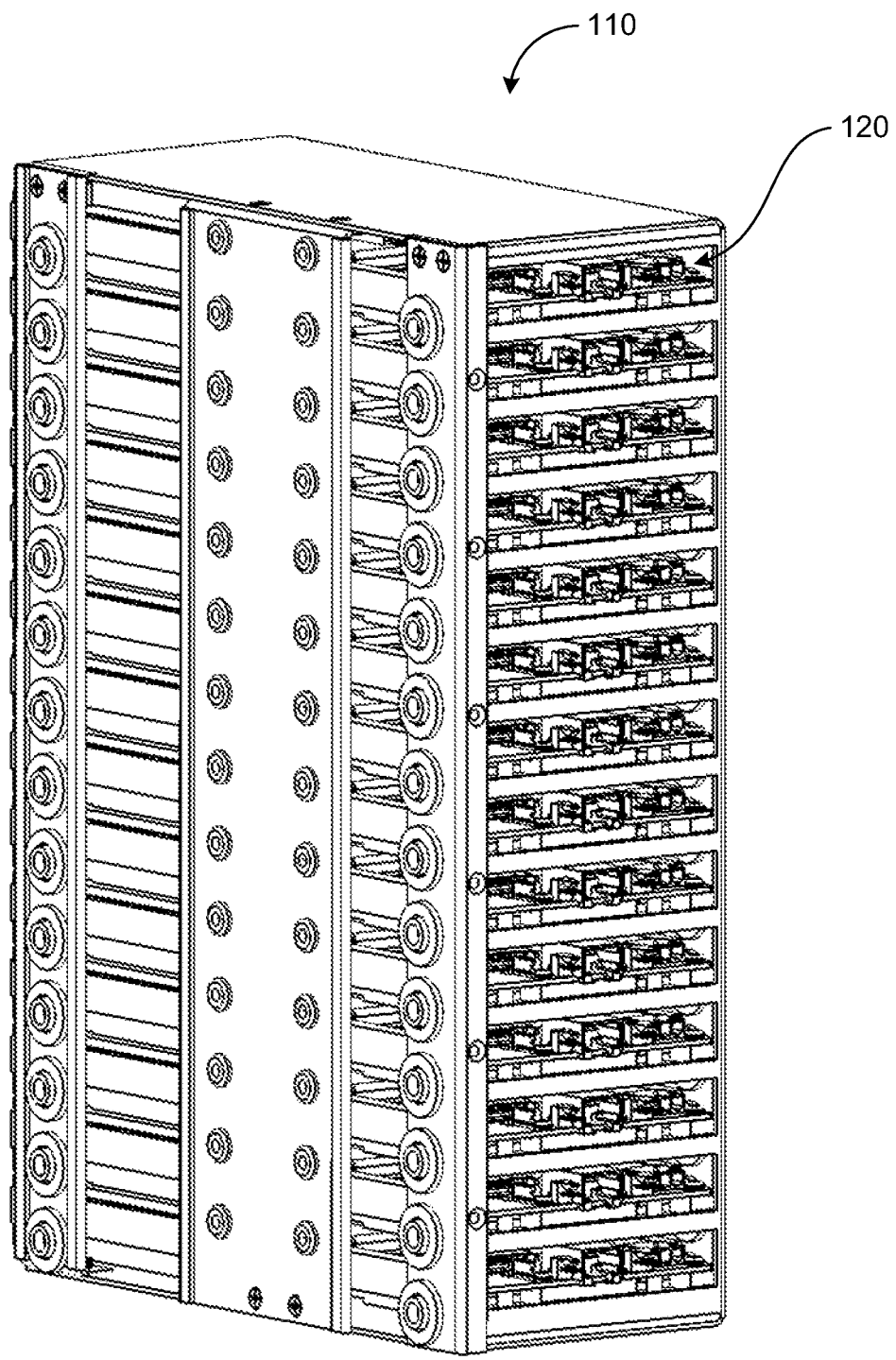

Each carrier receptacle 106 can support a test slot carrier 110. As shown in FIGS. 3A and 3B, each test slot carrier 110 supports a plurality of test slot assemblies 120. Different ones of the test slot carriers 110 can be configured for performing different types of tests and/or for testing different types of storage devices. The test slot carriers 110 are also interchangeable with each other within among the many carrier receptacles 106 within the testing system 10 allowing for adaptation and/or customization of the testing system 10, e.g., based on testing needs. In the example shown in FIGS. 2A and 2B, an air conduit 101 provides pneumatic communication between each test slot assembly 120 of the respective test rack 100 and an air heat exchanger 103. The air heat exchanger 103 is disposed below the carrier receptacles 106 remote to received test slot carriers 110. Additional details of the test rack infrastructure and features combinable with those described herein may also be found in the following U.S. patent application filed concurrently herewith, entitled "STORAGE DEVICE TESTING SYSTEM COOLING," inventor: Brian S. Merrow, and having assigned Ser. No. 12/698,575.

A storage device, as used herein, includes disk drives, solid state drives, memory devices, and any device that benefits from asynchronous testing. A disk drive is generally a non-volatile storage device which stores digitally encoded data on rapidly rotating platters with magnetic surfaces. A solid-state drive (SSD) is a data storage device that uses solid-state memory to store persistent data. An SSD using SRAM or DRAM (instead of flash memory) is often called a RAM-drive. The term solid-state generally distinguishes solid-state electronics from electromechanical devices.

Figure 4:
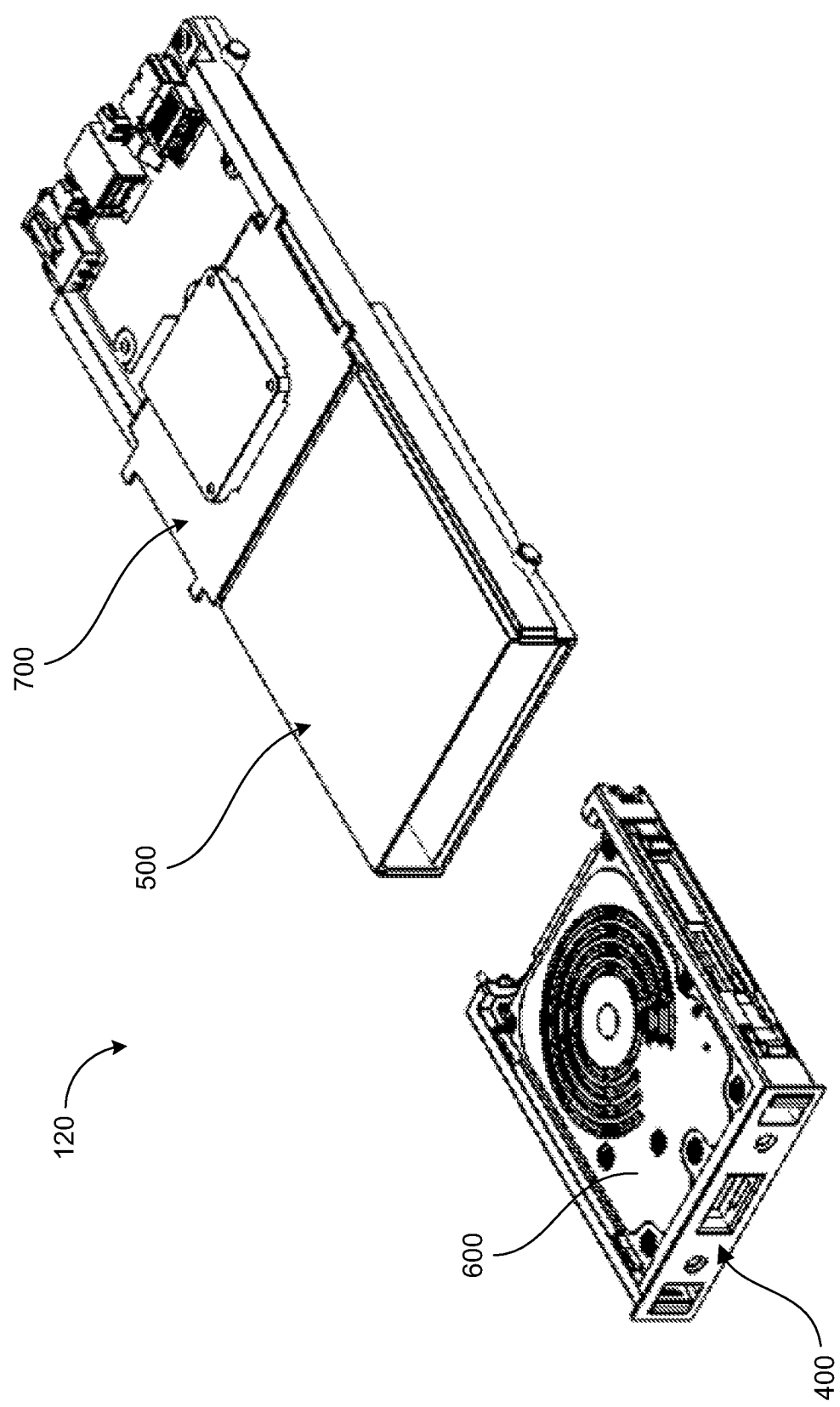
FIG. 4 is a perspective view of a test slot assembly.

As shown in FIG. 4, each test slot assembly 120 includes a storage device transporter 400, a test slot 500, and an associated air mover assembly 700. The storage device transporter 400 may be used for capturing storage devices 600 (e.g., from the transfer station 200) and for transporting the storage device 600 to one of the test slots 500 for testing.

Figure 5:
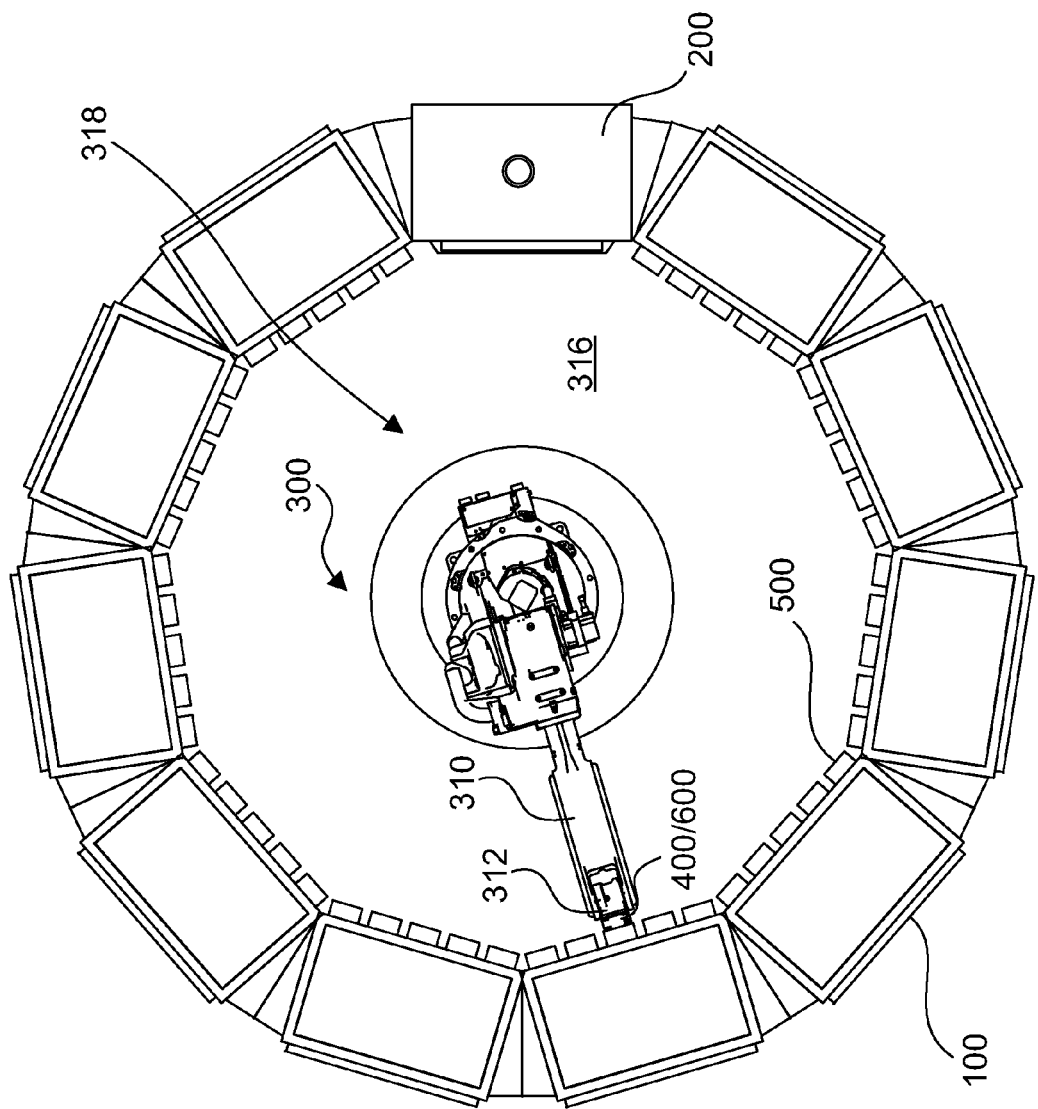
FIG. 5 is a top view of a storage device testing system.
Figure 6:
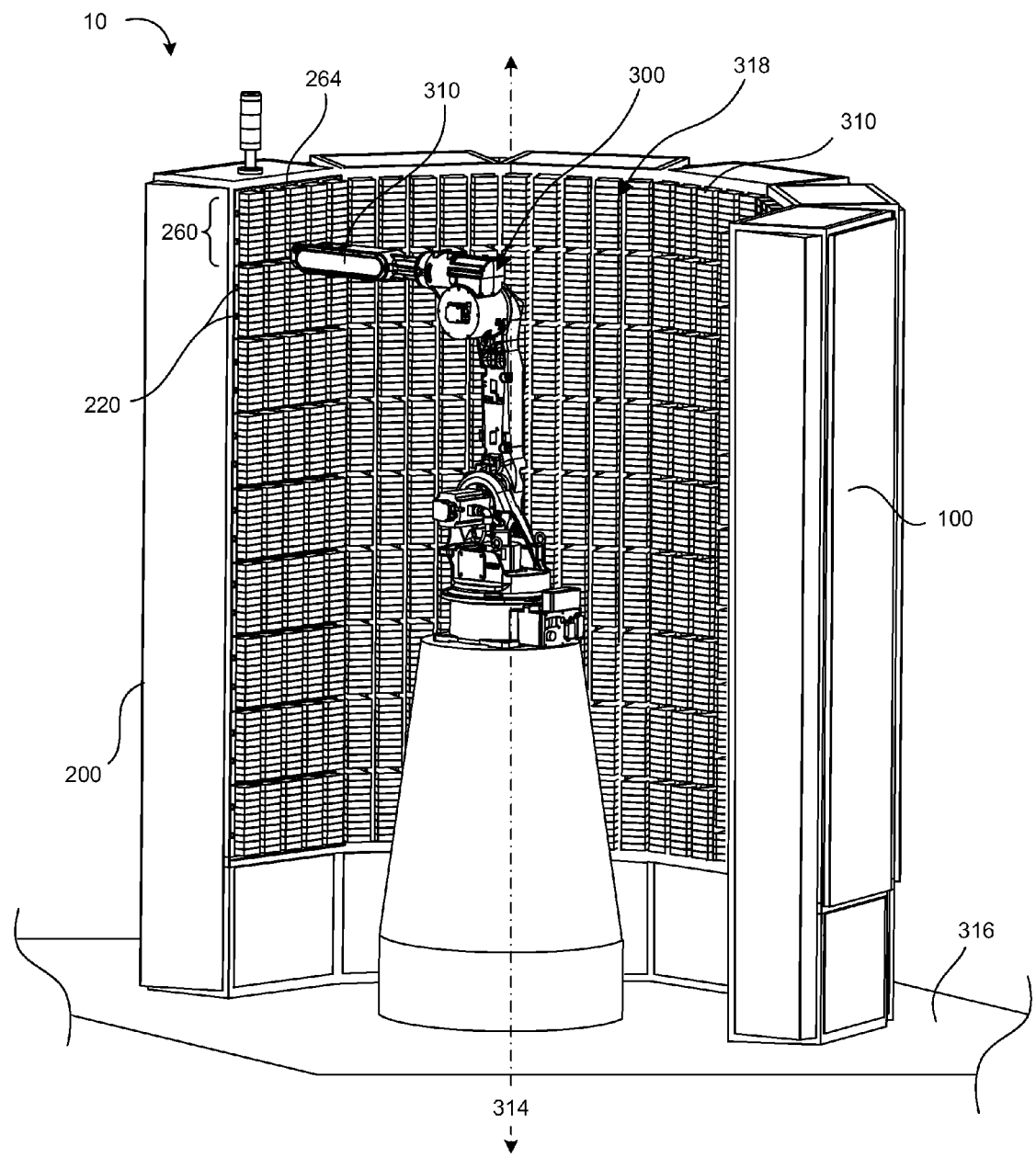
FIG. 6 is a perspective view of a storage device testing system.

Referring to FIGS. 5 and 6, the robot 300 includes a robotic arm 310 and a manipulator 312 (FIG. 5) disposed at a distal end of the robotic arm 310. The robotic arm 310 defines a first axis 314 (FIG. 6) normal to a floor surface 316 and is operable to rotate through a predetermined arc about and extends radially from the first axis 314 within a robot operating area 318.

The robotic arm 310 is configured to independently service each test slot 500 by transferring storage devices 600 between the transfer station 200 and the test racks 100. In some embodiments, the robotic arm 310 is configured to remove a storage device transporter 400 from one of the test slots 500 with the manipulator 312, then pick up a storage device 600 from the transfer station 200 with the storage device transporter 400, and then return the storage device transporter 400, with a storage device 600 therein, to the test slot 500 for testing of the storage device 600. After testing, the robotic arm 310 retrieves the storage device transporter 400, along with the supported storage device 600, from one of the test slots 500 and returns it to the transfer station 200 (or moves it to another one of the test slots 500) by manipulation of the storage device transporter 400 (i.e., with the manipulator 312). In some embodiments, the robotic arm 310 is configured to pick up a storage device 600 from the transfer station 200 with the manipulator 312, then move the storage device 600 to a test slot 500, and deposit the storage device 600 in the test slot 500 by means of depositing the storage device 600 in the storage device transporter 400 and then inserting the storage device transporter in the test slot 500. After testing, the robotic arm 310 uses the manipulator 312 to remove the storage device 600 from the storage device transporter 400 and return it to the transfer station 200.

Figure 7A:
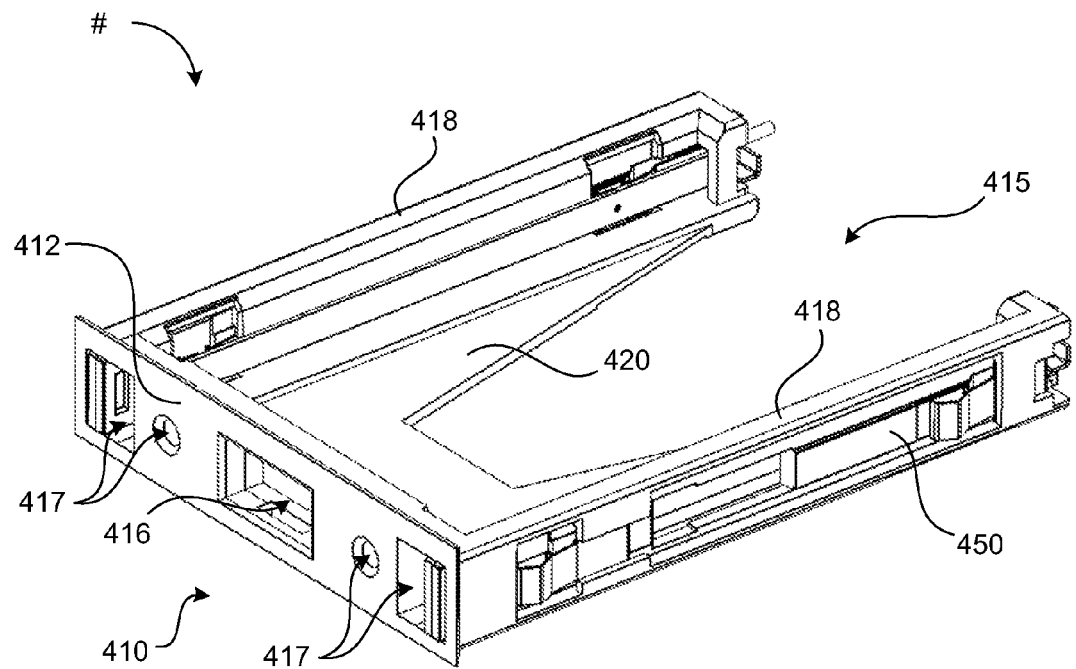
FIGS. 7A and 7B are perspective views of a storage device transporter.
Figure 7B:
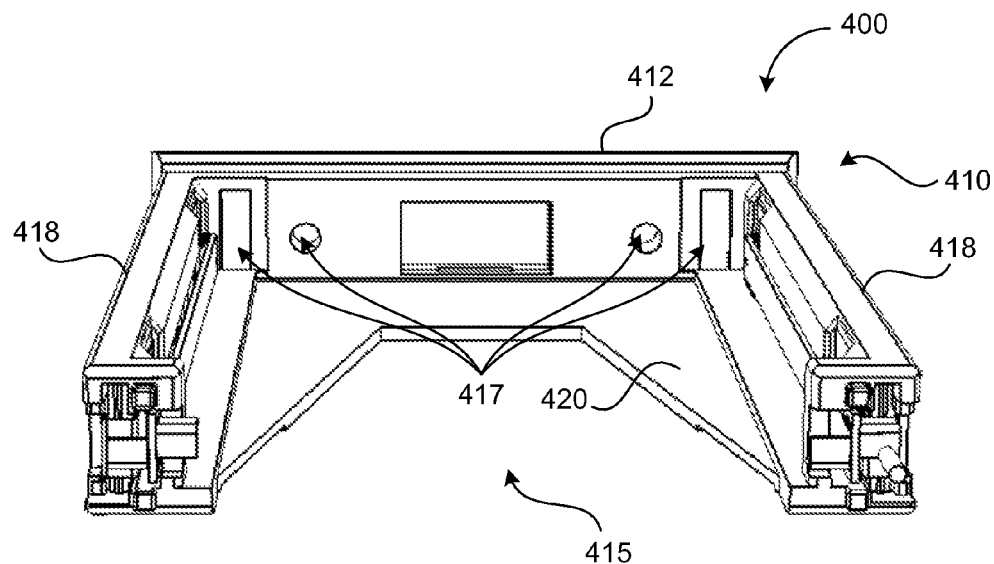

Referring to FIGS. 7A and 7B, the storage device transporter 400 includes a frame 410 and a clamping mechanism 450. The frame 410 includes a face plate 412. As shown in FIG. 7A, along a first surface 414, the face plate 412 defines an indentation 416. The indentation 416 can be releaseably engaged by the manipulator 312 (FIG. 5) of the robotic arm 310, which allows the robotic arm 310 to grab and move the transporter 400. In use, one of the storage device transporters 400 is removed from one of the test slots 500 with the robot 300 (e.g., by grabbing, or otherwise engaging, the indentation 416 of the transporter 400 with the manipulator 312 of the robot 300). The frame 410 defines a substantially U-shaped opening 415 formed by sidewalls 418 and a base plate 420.

Figure 8A:
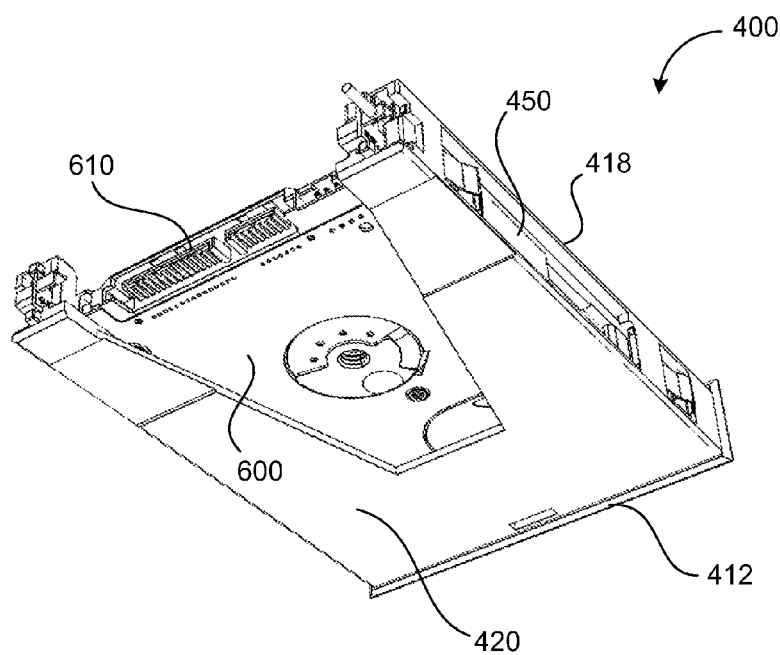
FIG. 8A is a perspective view of a storage device transporter supporting a storage device.
Figure 8B:
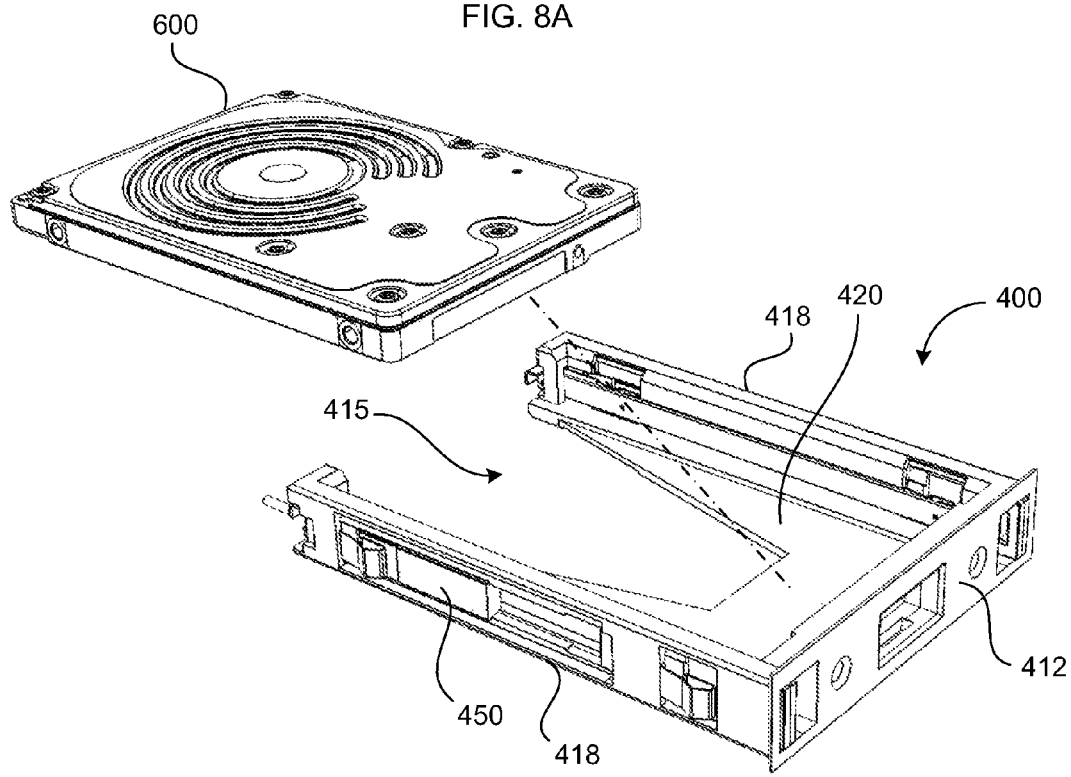
FIG. 8B is a perspective view of a storage device transporter receiving a storage device.
Figure 8C:
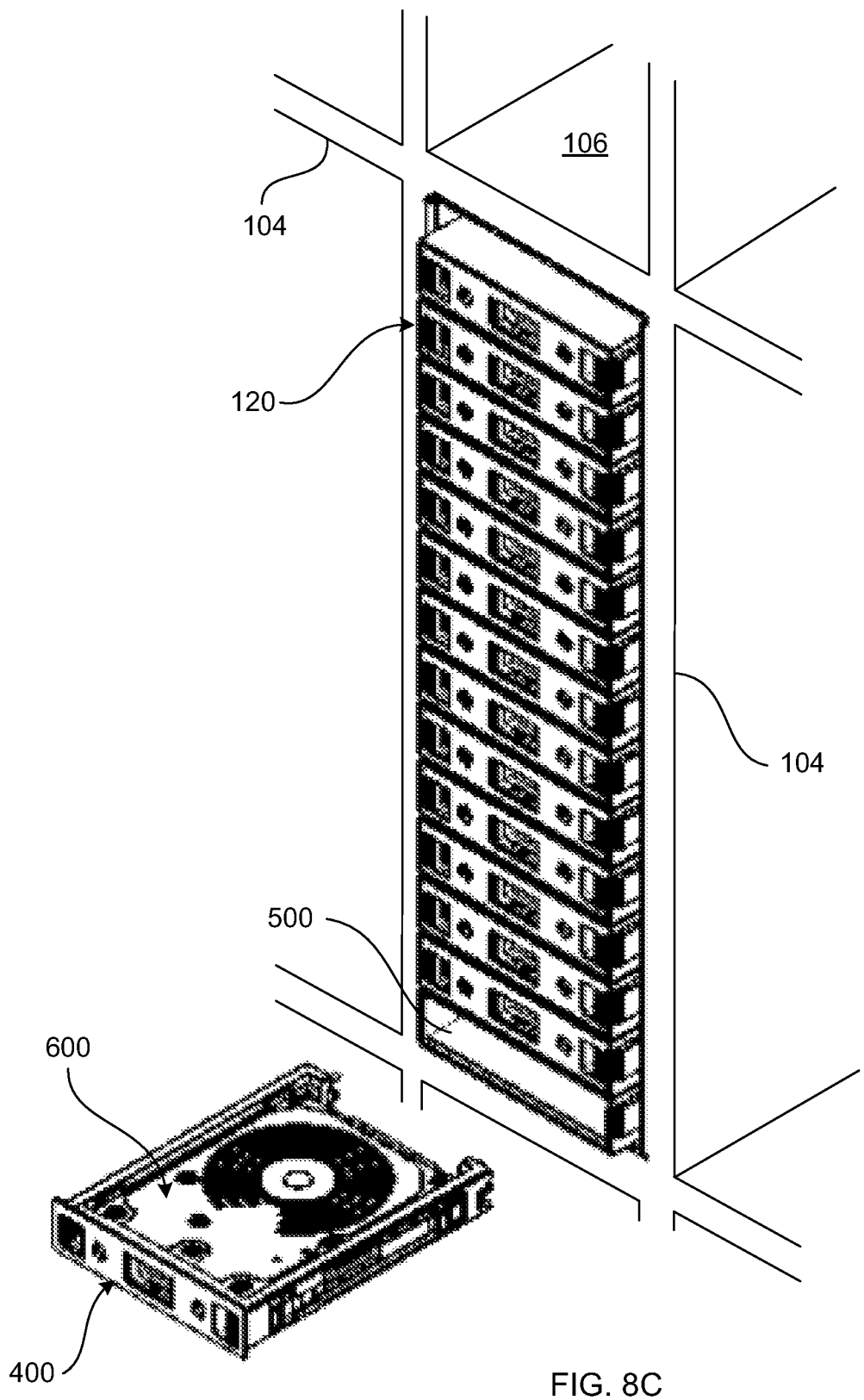
FIG. 8C is a perspective view of a storage device transporter carrying a storage device aligned for insertion into a test slot.
Figure 16:
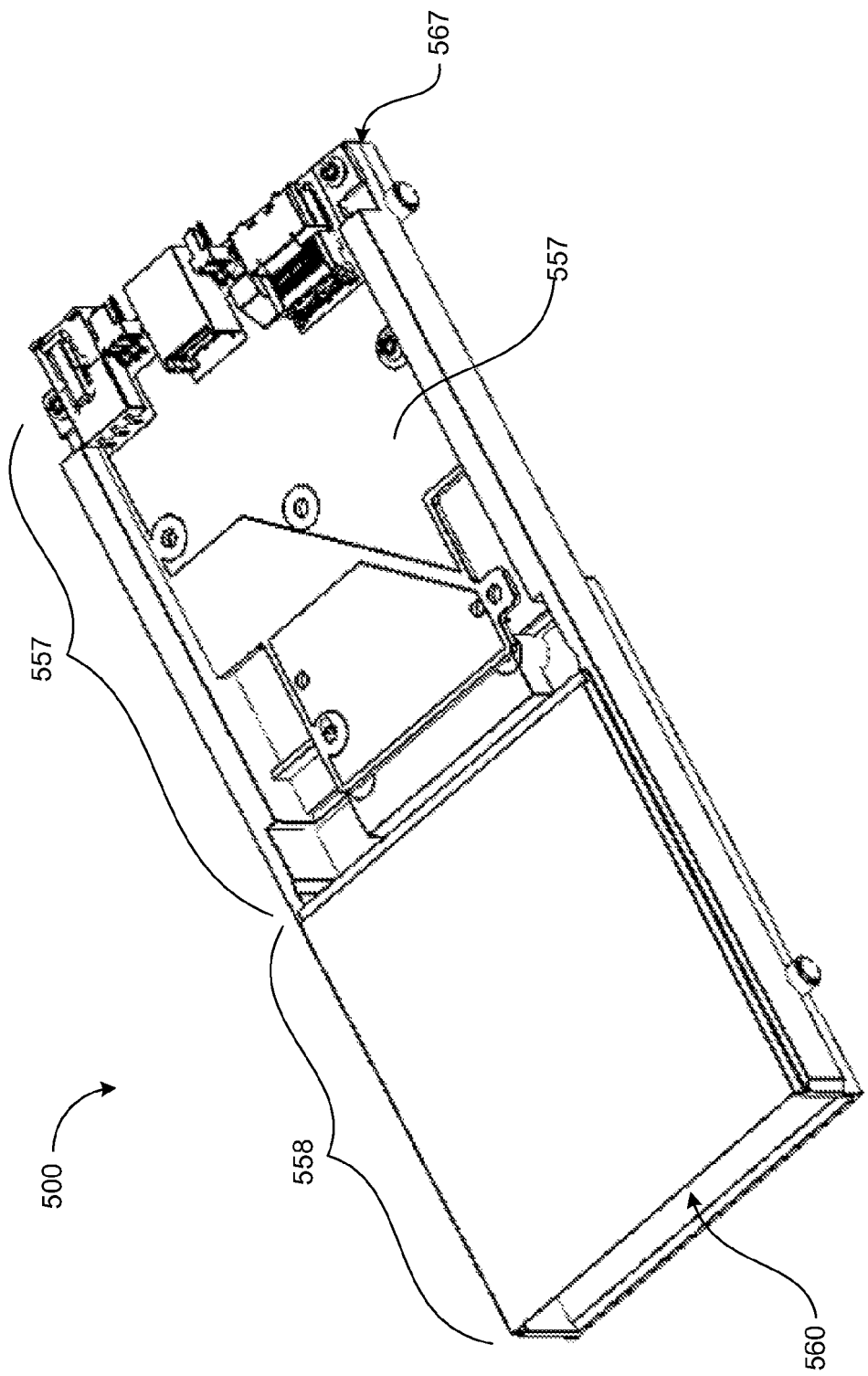
FIG. 16 is a perspective view of a test slot.

Referring to FIGS. 8A, 8B, and 8C, with the storage device 600 in place within the frame 410 of the storage device transporter 400, the storage device transporter 400 and the storage device 600 together can be moved by the robotic arm 310 (FIG. 5) for placement within one of the test slots 500. The manipulator 312 (FIG. 5) is also configured to initiate actuation of a clamping mechanism 450 disposed in the storage device transporter 400. Actuating the clamping mechanism 450 inhibits movement of the storage device 600 relative to the storage device transporter 400. Releasing the clamping mechanism 450 allows for insertion of the storage device transporter 400 into one of the test slots 500, until the storage device 600 is in a test position with a storage device connector 610 engaged with a test slot connector 574 (FIG. 16). The clamping mechanism 450 may also be configured to engage the test slot 500, once received therein, to inhibit movement of the storage device transporter 400 relative to the test slot 500. In such implementations, once the storage device 600 is in the test position, the clamping mechanism 450 is engaged again (e.g., by the manipulator 312) to inhibit movement of the storage device transporter 400 relative to the test slot 500. The clamping of the transporter 400 in this manner can help to reduce vibrations during testing. Additional details of the transporter 400 and the clamping mechanism 450 and other details and features combinable with those described herein may be found in the following U.S. patent application filed Jul. 15, 2009, entitled "CONDUCTIVE HEATING", with inventors: Brian S. Merrow et al., and having assigned Ser. No. 12/503,593, the entire contents of the which are hereby incorporated by reference.

Figure 9:
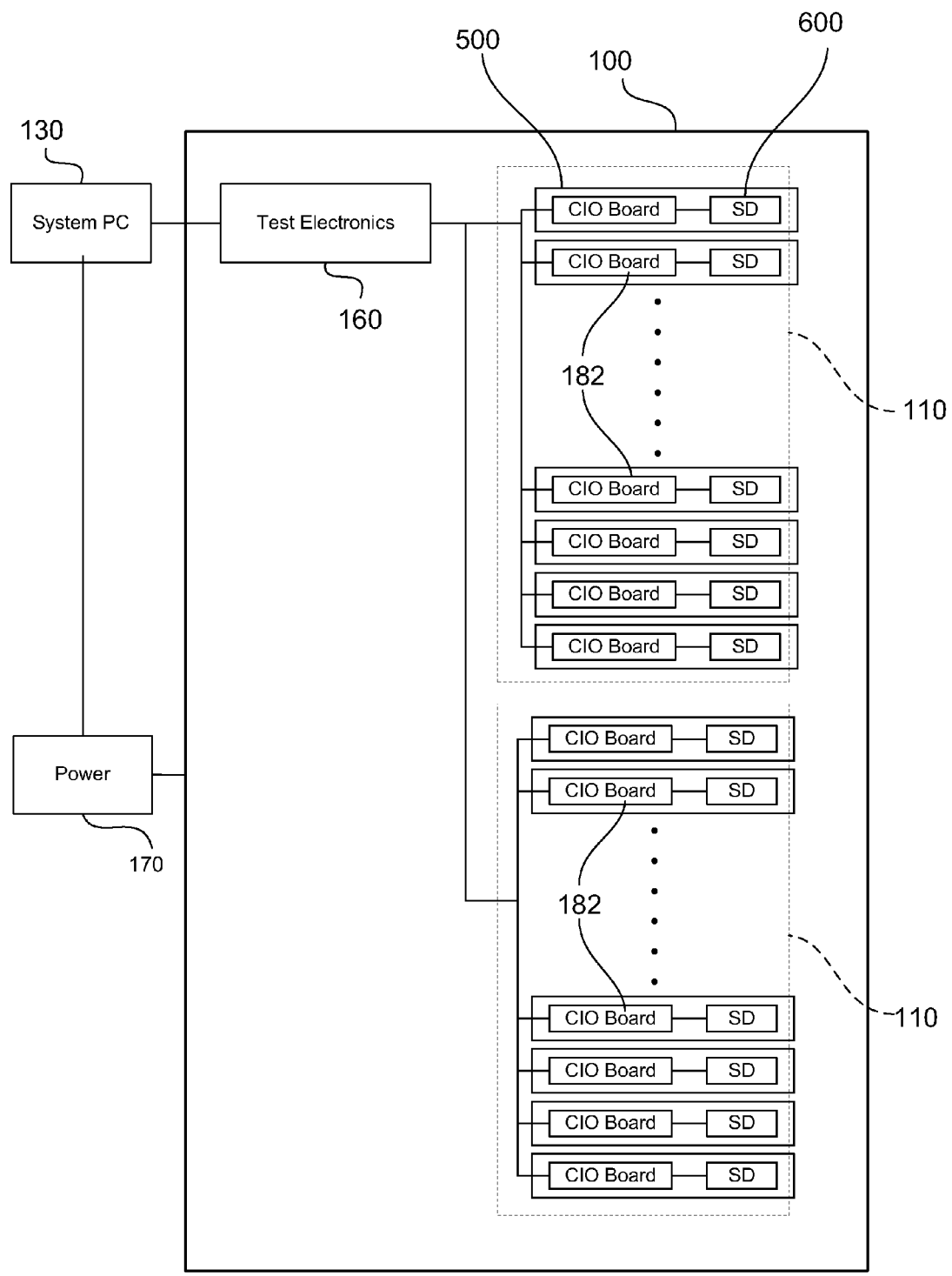
FIG. 9 is a schematic view of test circuitry.

Referring to FIG. 9, in some implementations, the storage device testing system 10 can also include at least one computer 130 in communication with the test slots 500. The computer 130 may be configured to provide inventory control of the storage devices 600 and/or an automation interface to control the storage device testing system 10. Test electronics 160 are in communication with each test slot 500. The test electronics 160 are in electrical communication with connection interface circuits 182 that are disposed within each the test slots 500. These connection interface circuits 182 are arranged for electrical communication with a storage device 600 received within the associated test slot 500, and thereby provide for communication between the test electronics 160 and storage devices 600 within the test slots 500, e.g., for executing test routines. The test routines may include a functionality test, which can include testing the amount of power received by the storage device 600, the operating temperature, the ability to read and write data, and the ability to read and write data at different temperatures (e.g. read while hot and write while cold, or vice versa). The functionality test may test every memory sector of the storage device 600 or only random samplings. The functionality test may test an operating temperature of the storage device 600 and also the data integrity of communications with the storage device 600.

As shown in FIG. 9, a power system 170 supplies power to the storage device testing system 10. The power system 170 may monitor and/or regulate power to the received storage device 600 in the test slot 500

Test Slot Carrier

Figure 10:
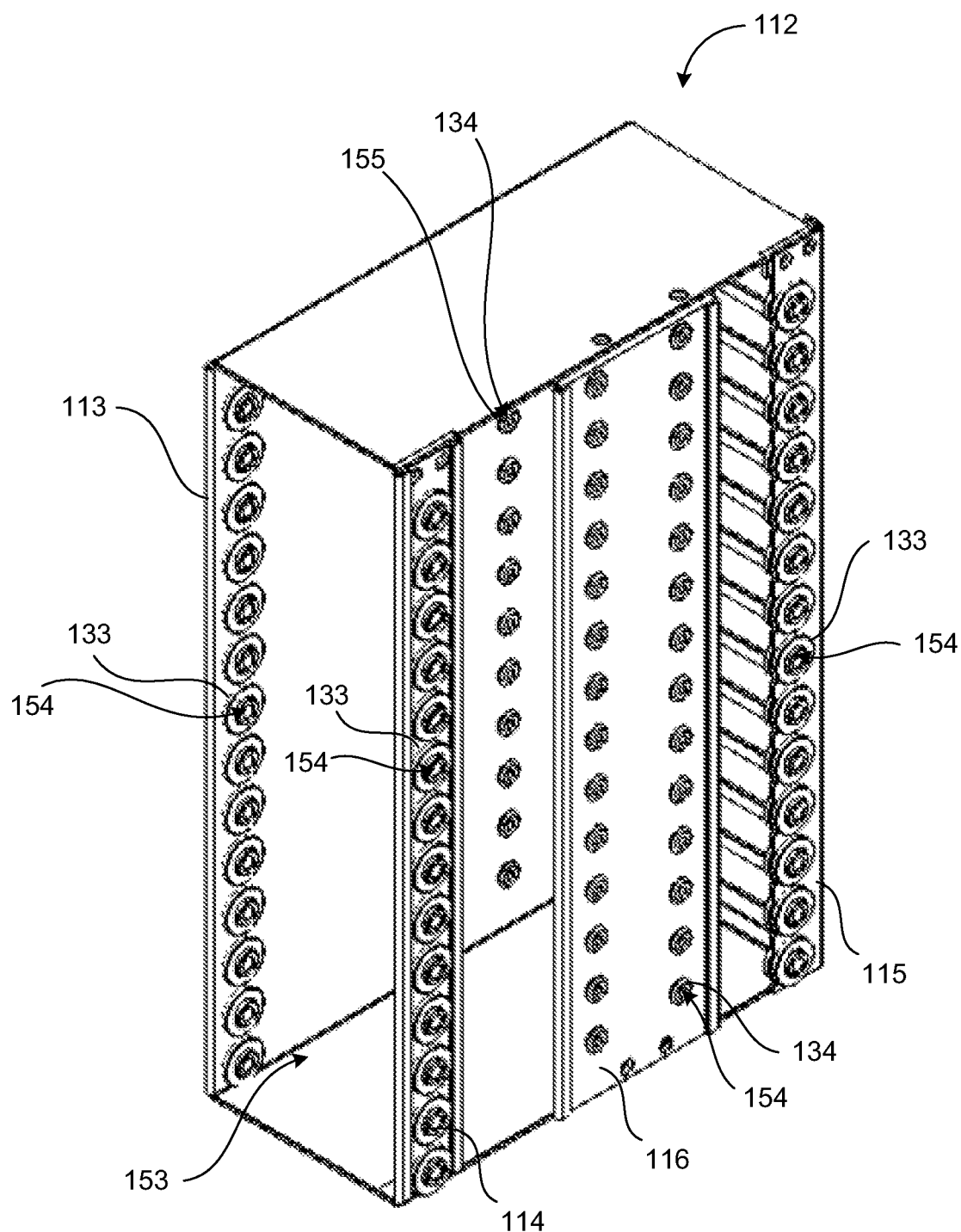
FIG. 10 is a perspective view of a body of a test slot carrier.

All of the test slot carriers 110 can have the same general construction. The test slot carriers 110 (FIG. 3) generally include a body 112 which supports a plurality of the test slot assemblies 120 (FIG. 4). Referring to FIG. 10, the body 112 includes a main body member 113, and side support members (i.e., first, second, and third side support members 114, 115, 116). The main body member 113 and side support members 114, 115, 116 can each be formed of one or more sheet metal and/or molded plastic parts.

Figure 11A:
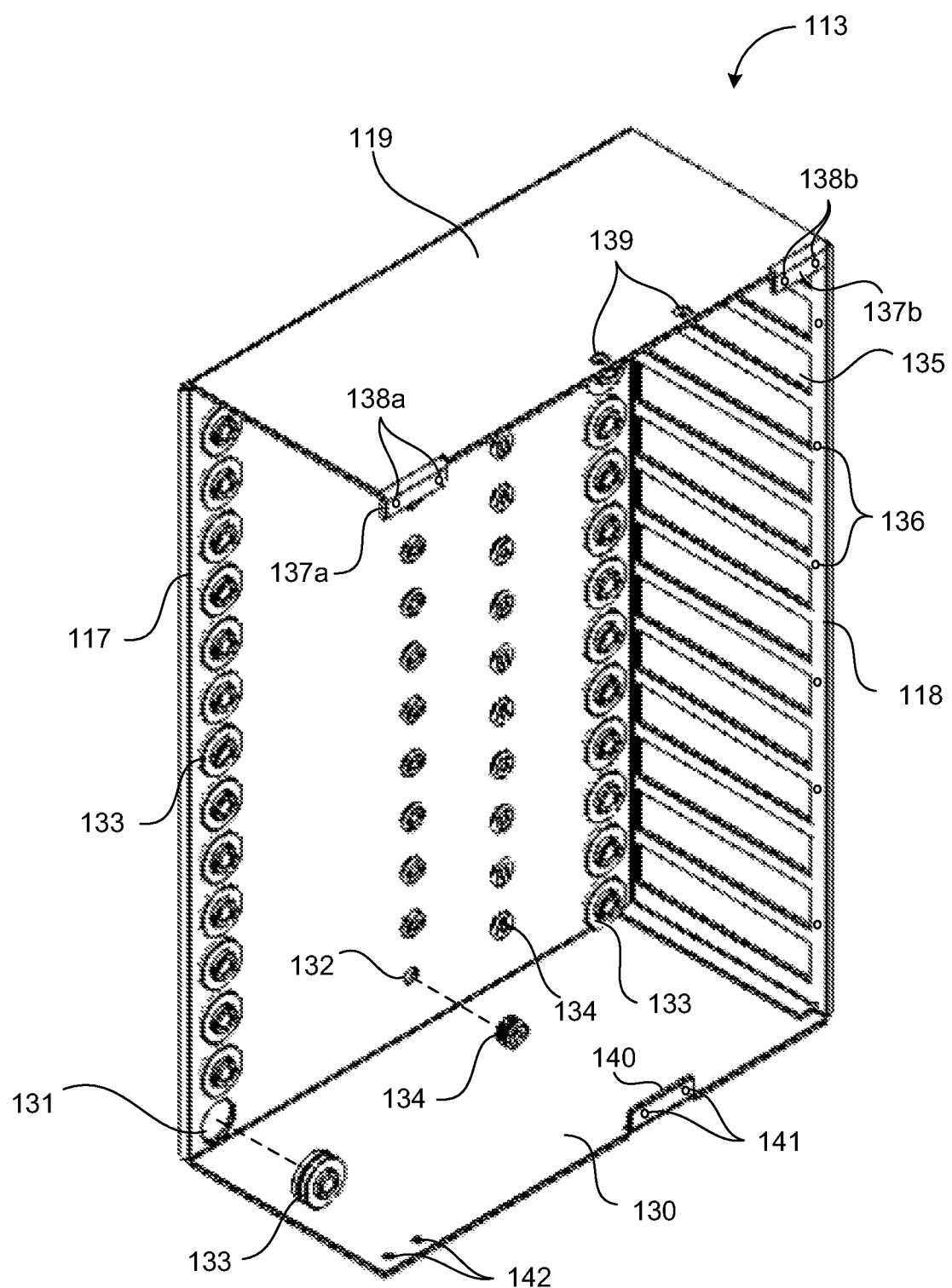
FIGS. 11A and 11B are perspective view of a main body member from the body of FIG. 10.
Figure 11B:
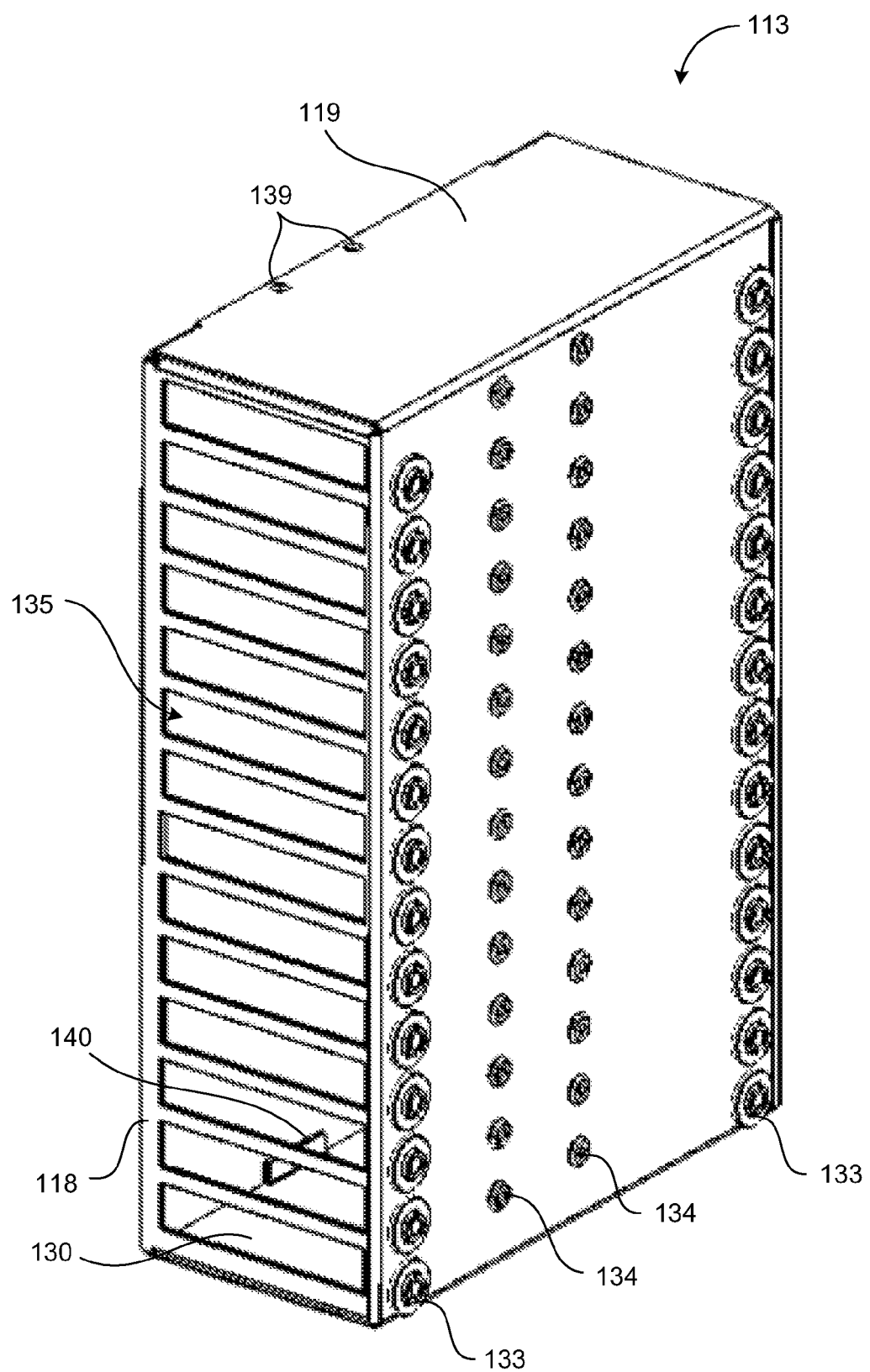

Referring to FIGS. 11A and 11B, the main body member 113 includes a side wall portion 117, a back wall portion 118, a top wall portion 119, and a bottom wall portion 130. The side wall portion 117 includes a plurality of first apertures 131 (FIG. 11A) and a plurality of second apertures 132 (FIG. 11A). The side wall portion 117 also includes a plurality of first isolators (e.g., first grommets 133), each disposed within one of the first apertures 131, and a plurality of second isolators (e.g., second grommets 134), each disposed within one of the second apertures 132. The first and second grommets 133, 134 serve as interfaces between the body 112 and the test slot assemblies 120. The first grommets 133 may be formed from a mechanical vibration isolating material, such as thermoplastic vinyl, e.g., having a durometer of between about 20 shore A and about 60 shore A. The second grommets 134 may be formed from a mechanical vibration isolating material, such as thermoplastic vinyl, e.g., having a durometer of between about 20 shore A and about 60 shore A.

The back wall portion 118 includes a plurality of rectangular openings 135 and a plurality of threaded holes 136, which receive mounting hardware (e.g., screws) for securing the second side support member 115 to the back wall portion 118.

The top wall portion 119 includes a pair of mounting tabs 137a, 137b with threaded holes 138a, 138b, which receive mounting hardware (e.g., screws) for connection with the first and second side support members 114, 115. The top wall portion 119 also includes through-holes 139, which receive mounting hardware (e.g., screws) for connecting the third side support member 116 to the top wall portion 119.

The bottom wall portion 130 includes a mounting tab 140 with threaded holes 141, which receive mounting hardware (e.g., screws) for connecting the third side support member 116 to the bottom wall portion 130. The bottom wall portion 130 also includes through-holes 142, which receive mounting hardware (e.g., screws) for connecting the first side support member 114 to the bottom wall portion 130.

Figure 12A:
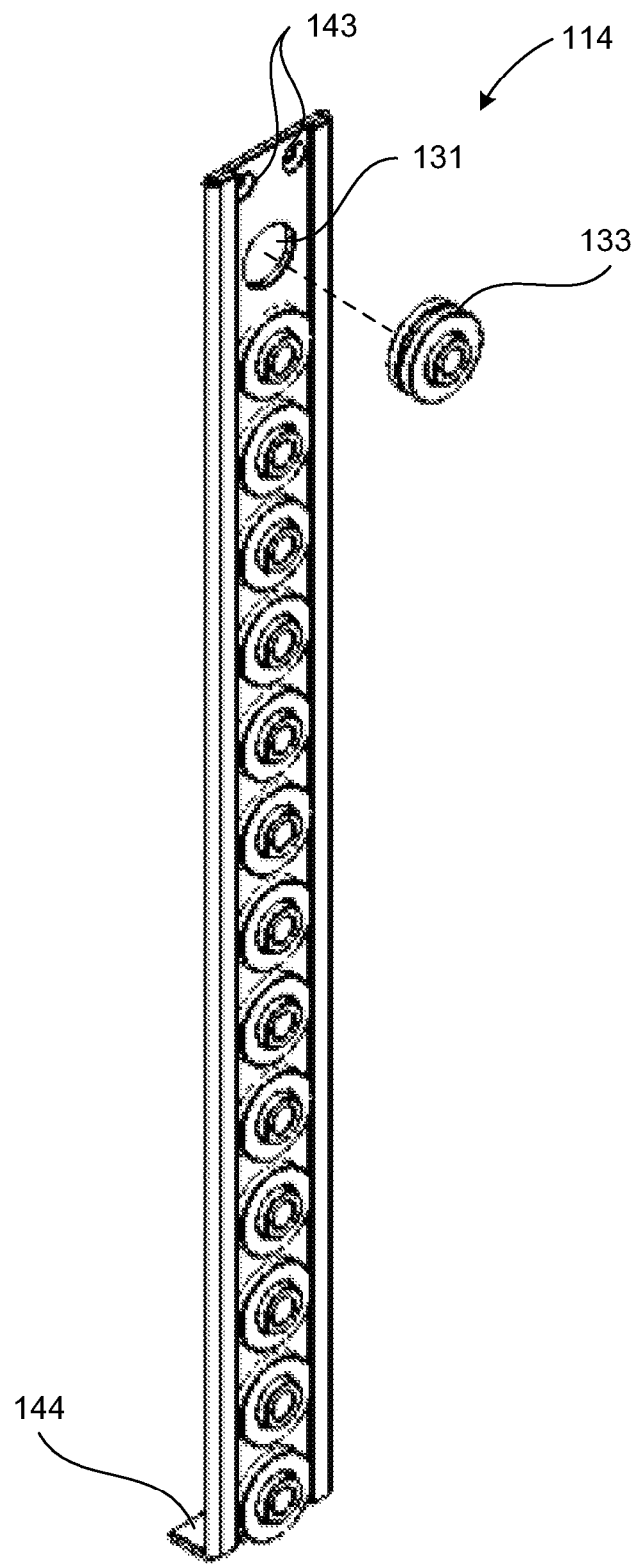
FIGS. 12A and 12B are perspective views of a first side support member from the body of FIG. 10.
Figure 12B:
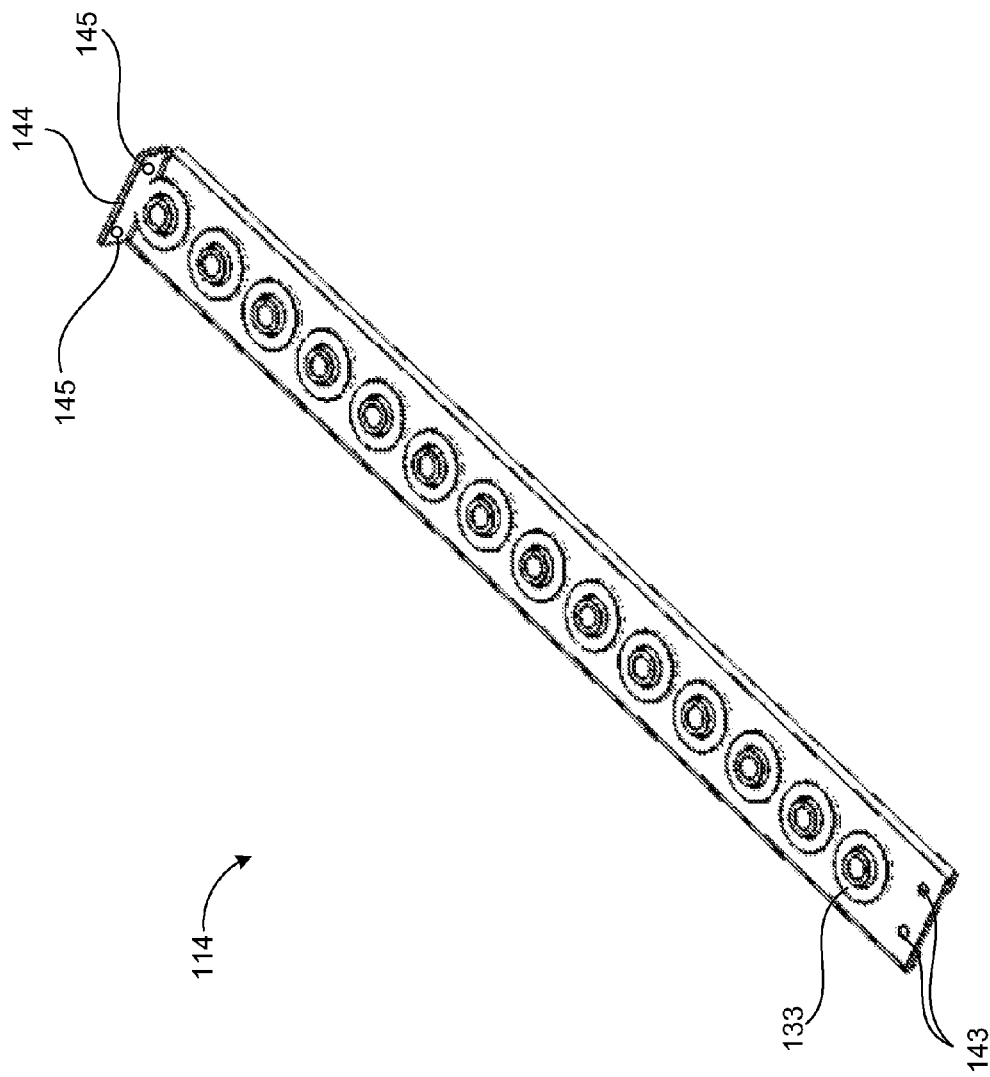

Referring to FIG. 12A, the first side support member 114 includes a plurality of the first apertures 131 and a plurality of the first isolators (e.g., the first grommets 133) each disposed within one of the first apertures 131. The first side support member 114 also includes through-holes 143, which align with the threaded holes 138a of the main body member 113 and allow the first side support member 114 to be mounted to the main body member 113. As shown in FIG. 12B, the first side support member 114 also includes a flange 144 with threaded holes 145. The threaded holes 145 align with the through holes 142 in the bottom wall portion 130 and receive mounting hardware (e.g., screws), for securing the first side support member 114 to the bottom wall portion 130.

Figure 13A:
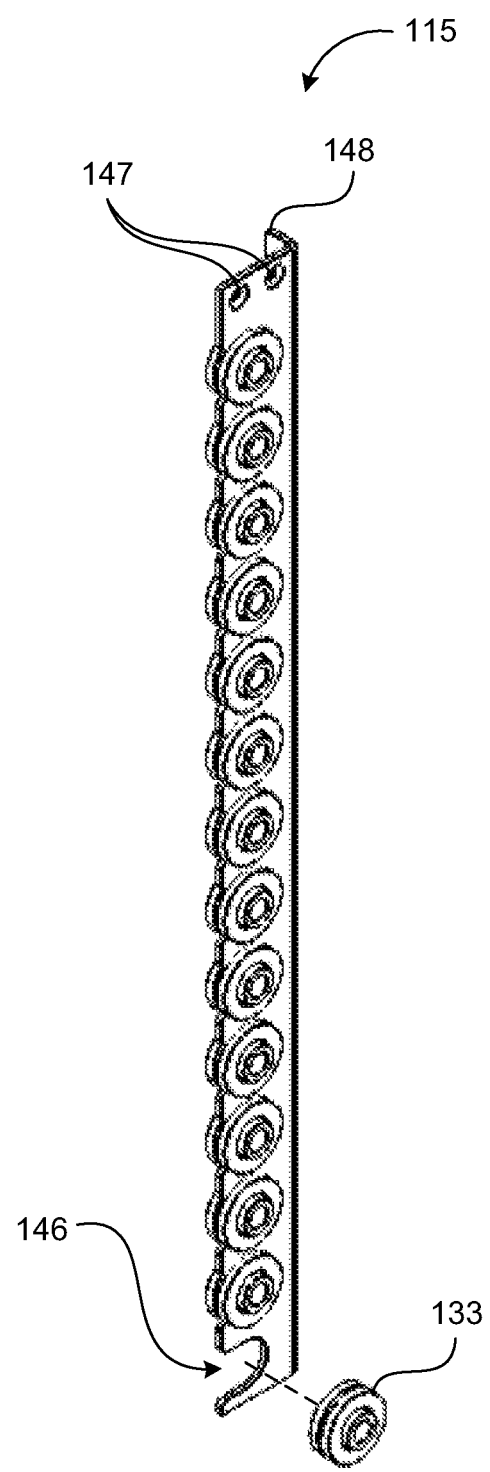
FIGS. 13A and 13B are perspective views of a second side support member from the body of FIG. 10.
Figure 13B:
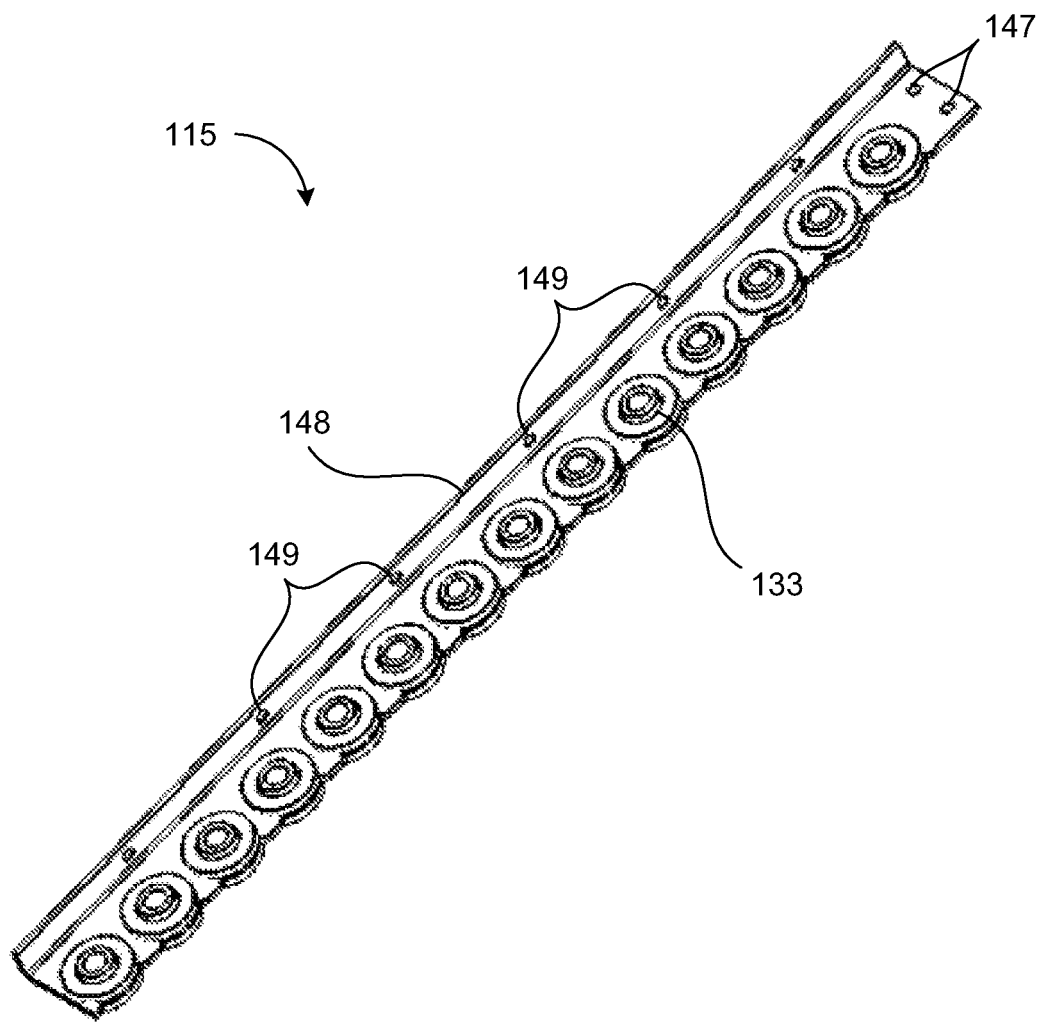

Referring to FIG. 13A, the second side support member 115 includes a plurality of recesses 146 and a plurality of the first isolators (e.g., the first grommets 133) each disposed within one of the recesses 146. The second side support member 115 also includes through-holes 147, which align with the threaded holes 138b of the main body member 113 and allow the second side support member 115 to be mounted to the main body member 113. As shown in FIG. 13B, the second side support member 115 also includes a lip 148 with through-holes 149. The through-holes 149 align with the threaded holes 136 in the back wall portion 118 (FIG. 11A) and receive mounting hardware (e.g., screws), for securing the second side support member 115 to the back wall portion 118.

Figure 14A:
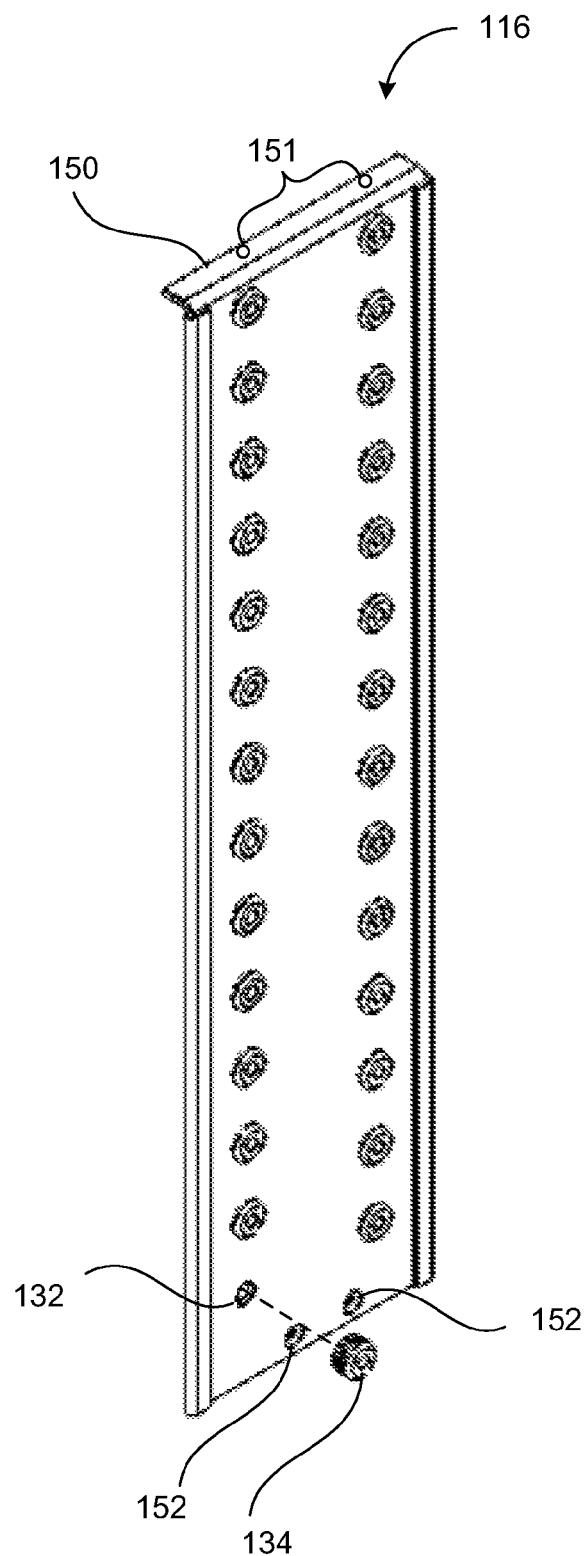
FIGS. 14A and 14B are perspective views of a third side support members from the body of FIG. 10.
Figure 14B:
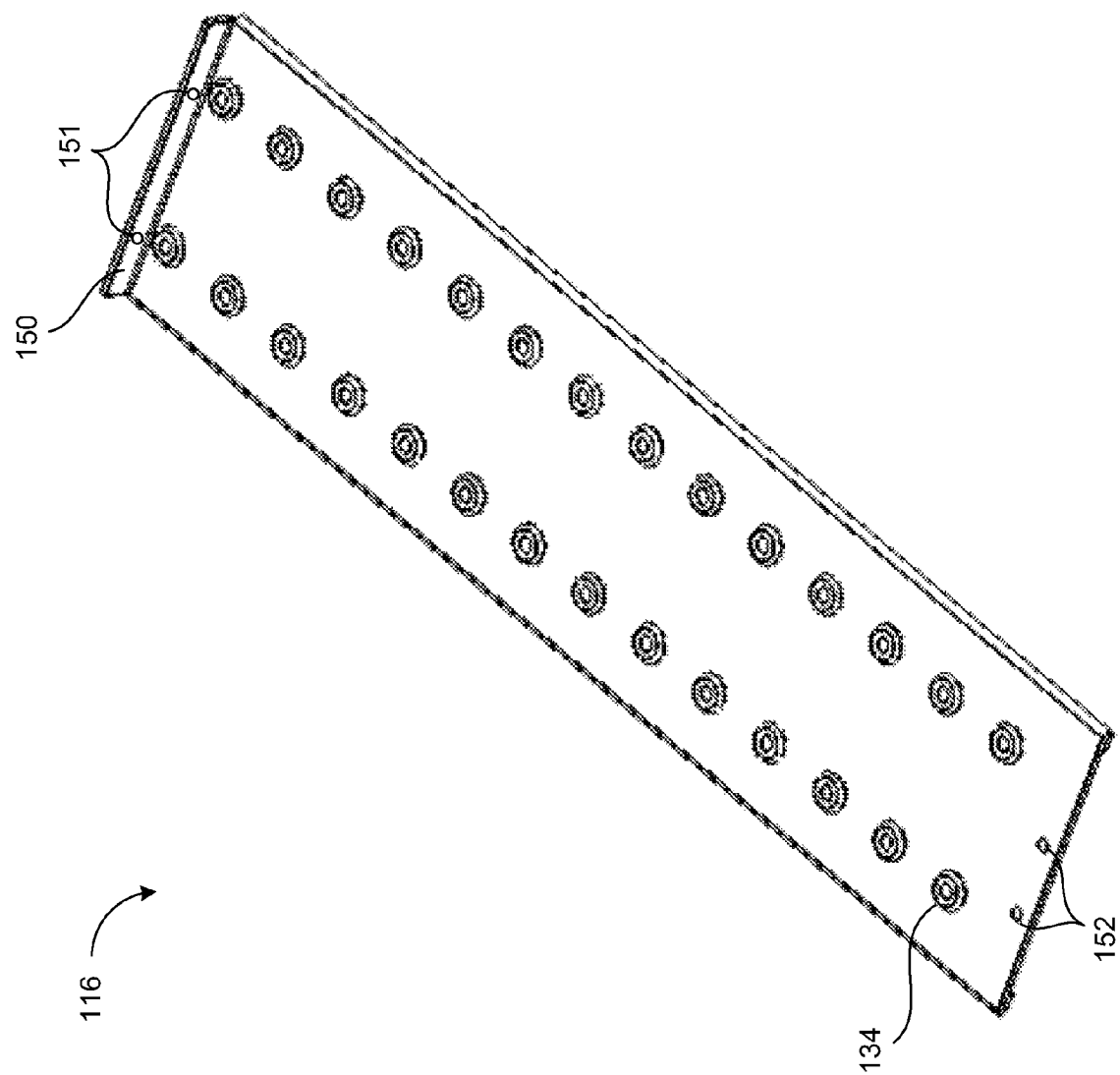

Referring to FIGS. 14A and 14B, the third side support member 116 includes a plurality of the second apertures 132 and a plurality of the second isolators (e.g., the second grommets 134) each disposed within one of the second apertures 132. The third side support member 116 also includes a mounting tab 150 with threaded holes 151. The threaded holes 151 align with the through-holes 139 (FIG. 11A) in the top wall portion 119, which allows the third side support member 116 to be connected to the top wall portion 119 (e.g., with screws). The third side support member 116 also includes through-holes 152. The through-holes 152 align with the threaded holes 141 in the bottom wall portion 130 (FIG. 11A), which allows the third side support member 116 to be connected to the bottom wall portion 130 (e.g., with screws).

The main body member 113 and side support members 114, 115, 116 together define a cavity 153 (FIG. 10) for receiving the test slot assemblies 120. Corresponding features of the test slot assemblies 120 interface with the first and second grommets 133, 134 in the main body member 113 and support members 114, 115, 116, which, in turn, allows the test slot assemblies 120 to be supported within the cavity 153 (as shown, e.g., in FIG. 3).

Figure 15A:
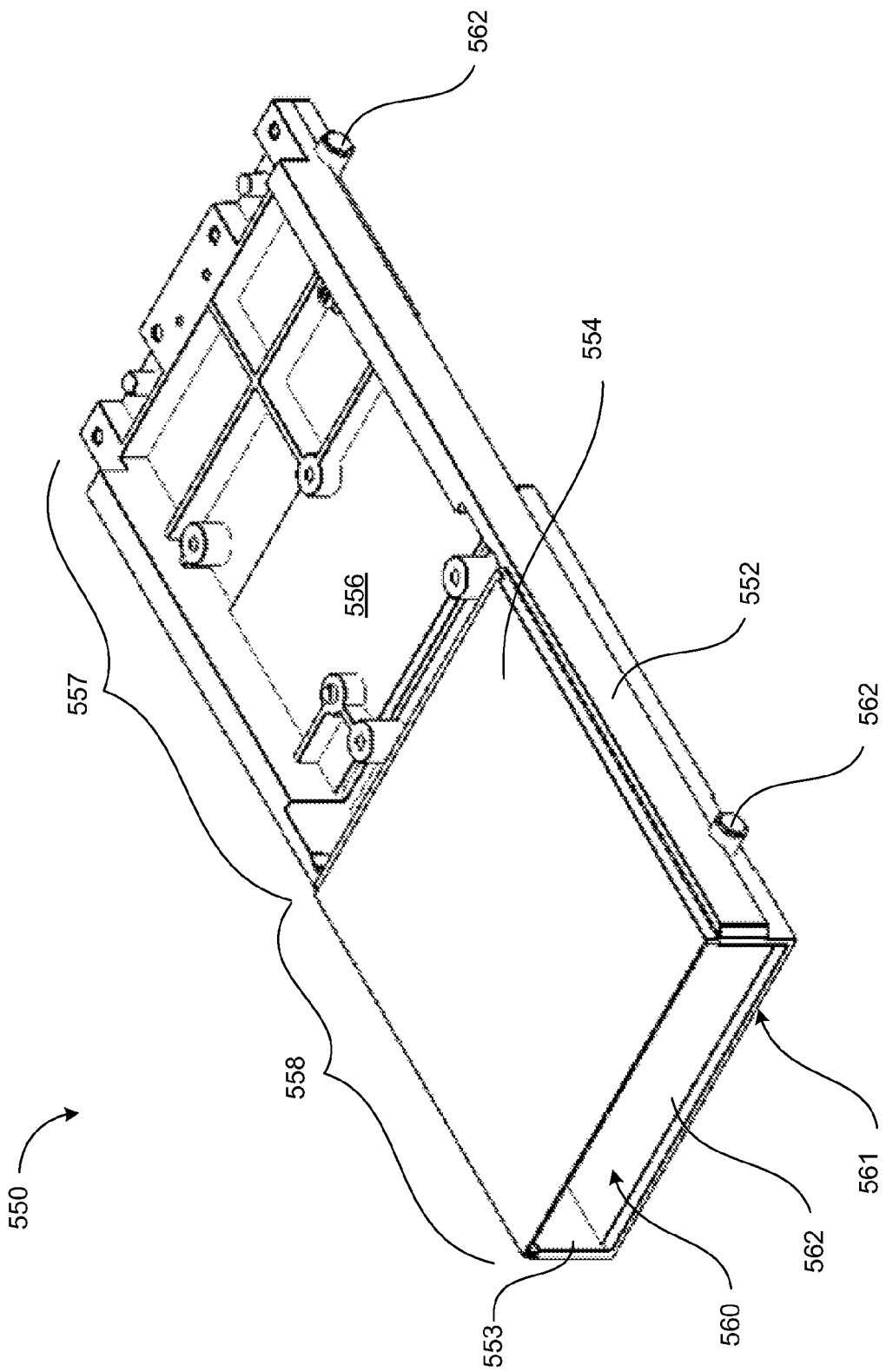
FIGS. 15A and 15B are perspective views of a test slot housing.
Figure 15B:
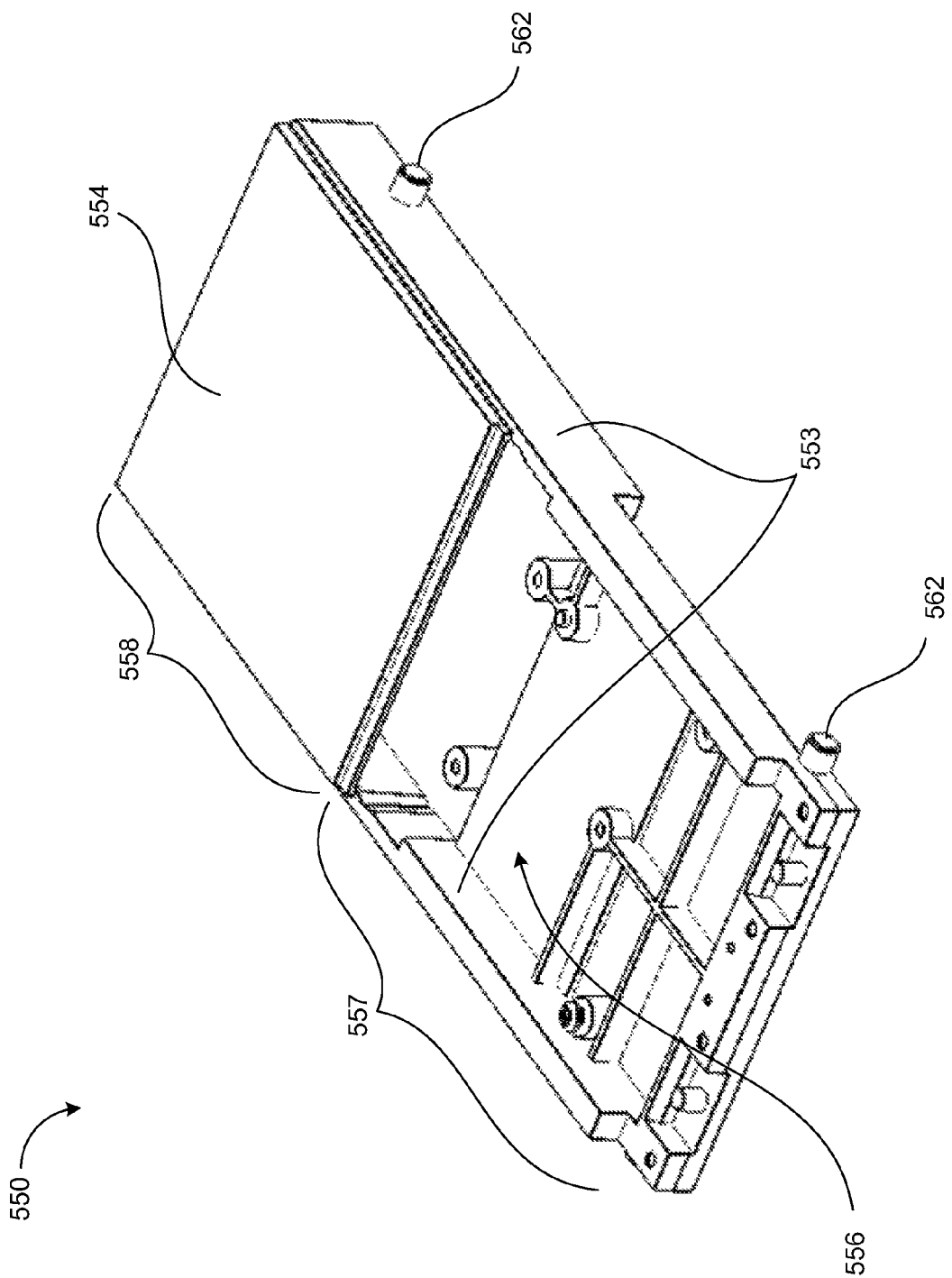

Referring to FIGS. 15A and 15B, each of the test slots 500 includes a housing 550 having a base 552, upstanding walls 553, and a cover 554. In the illustrated embodiment, the cover 554 is integrally molded with the base 552 and the upstanding walls 553. The housing 550 defines an internal cavity 556 which includes a rear portion 557 and a front portion 558. The front portion 558 defines a test compartment 560 for receiving and supporting one of the storage device transporters 400.

The upstanding walls 533 include outwardly extending protrusions 562. The protrusions 562 interface with the first grommets 133 in the body 112 (FIG. 10) and thereby help to support the test slots 500 within the body 112. More specifically, when assembled with the body 112, the protrusions 562 each sit within a hole 154 (FIG. 11A) in a corresponding one of the first grommets 133. The first grommets 133, being formed of a mechanical vibration isolating material, inhibit the transmission of vibrations between the test slots 500 and the body 112.

The base 552, upstanding walls 553, and the cover 554 together define a first open end 561, which provides access to the test compartment 560 (e.g., for inserting and removing the storage device transporter 400)

As shown in FIG. 16, the rear portion 557 of the internal cavity 556 houses a connection interface board 570, which carries the associated connection interface circuit 182 (FIG. 9). The connection interface board 570 extends between the test compartment 560 and a second end 567 of the housing 550.

Figure 17:
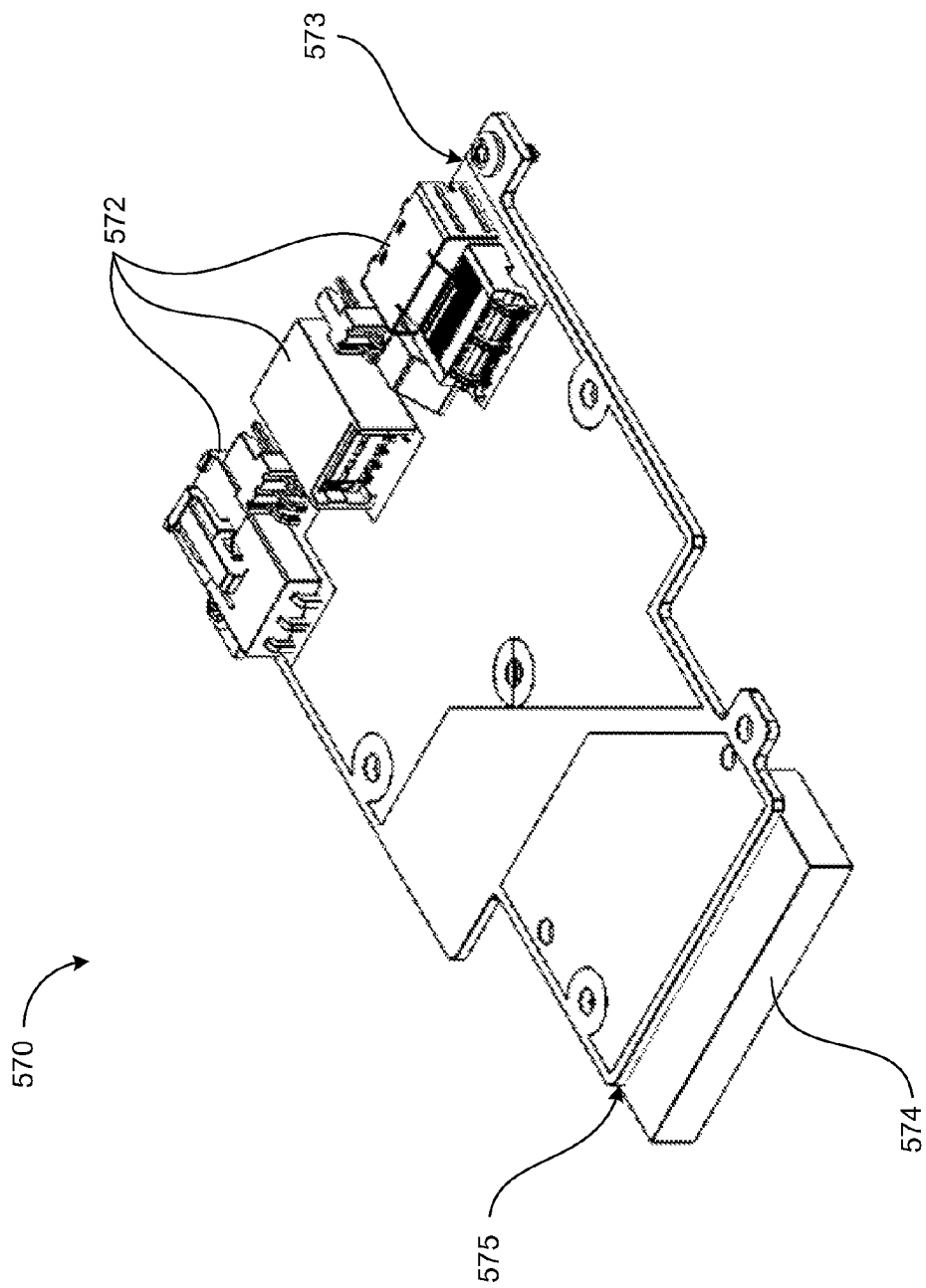
FIG. 17 is a perspective view of a connection interface board.

Referring to FIG. 17, a plurality of electrical connectors 572 are disposed along a distal end 573 of the connection interface board 570. The electrical connectors 572 provide for electrical communication between the connection interface circuit 182 and the test electronics 160 (FIG. 9) in the associated test rack 100. When the test slot 500 is mounted within the body 112 (FIG. 10), the electrical connectors 572 are accessible through the rectangular openings 135 in the back wall portion 118 of the main body member 113. The connection interface board 570 also includes a test slot connector 574, arranged at a proximal end 575 of the connection interface board 570, which provides for electrical communication between the connection interface circuit 182 and a storage device 600 in the test slot 500.

Figure 18A:
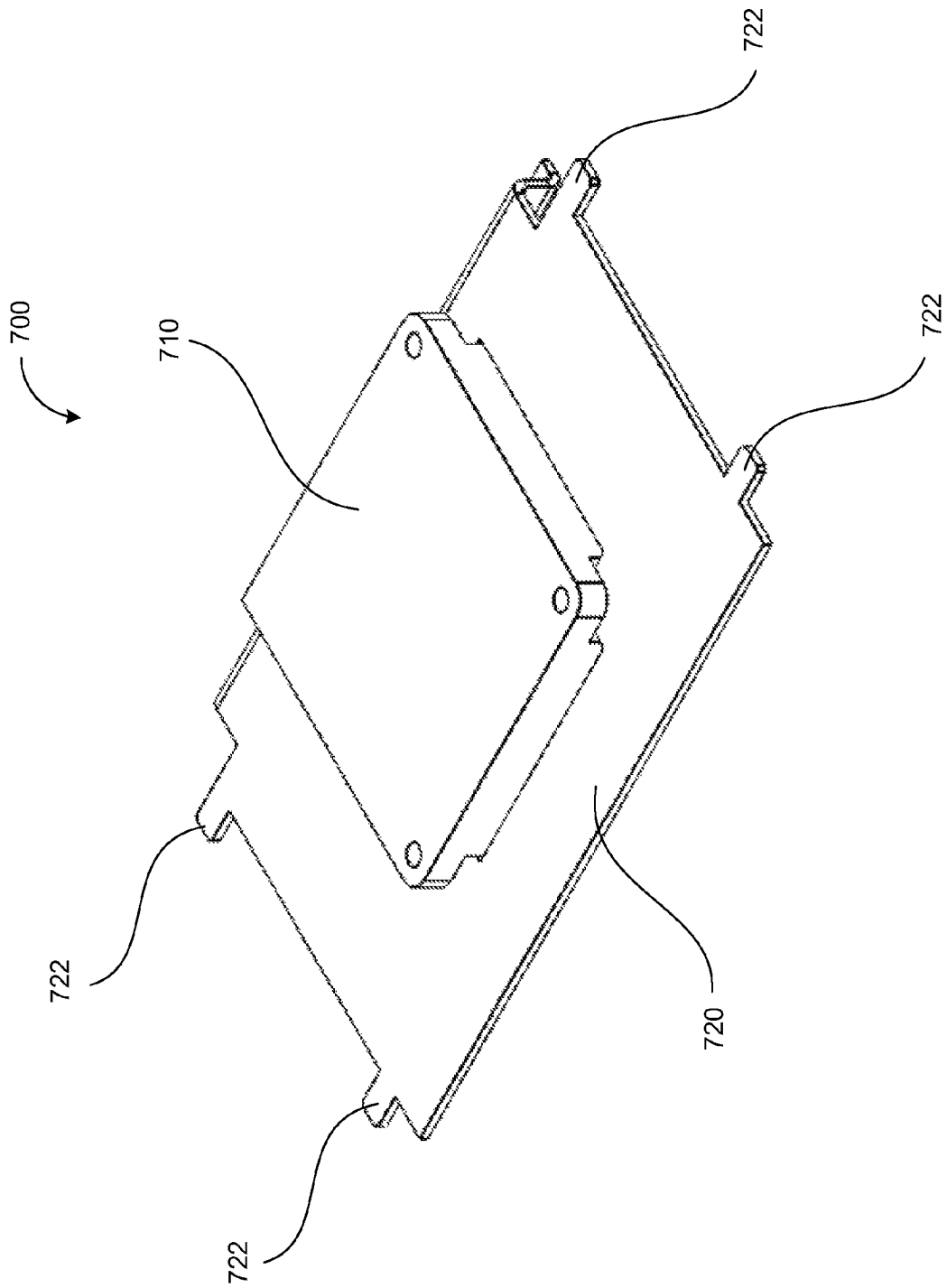
FIGS. 18A and 18B are perspective views of an air mover assembly.
Figure 18B:
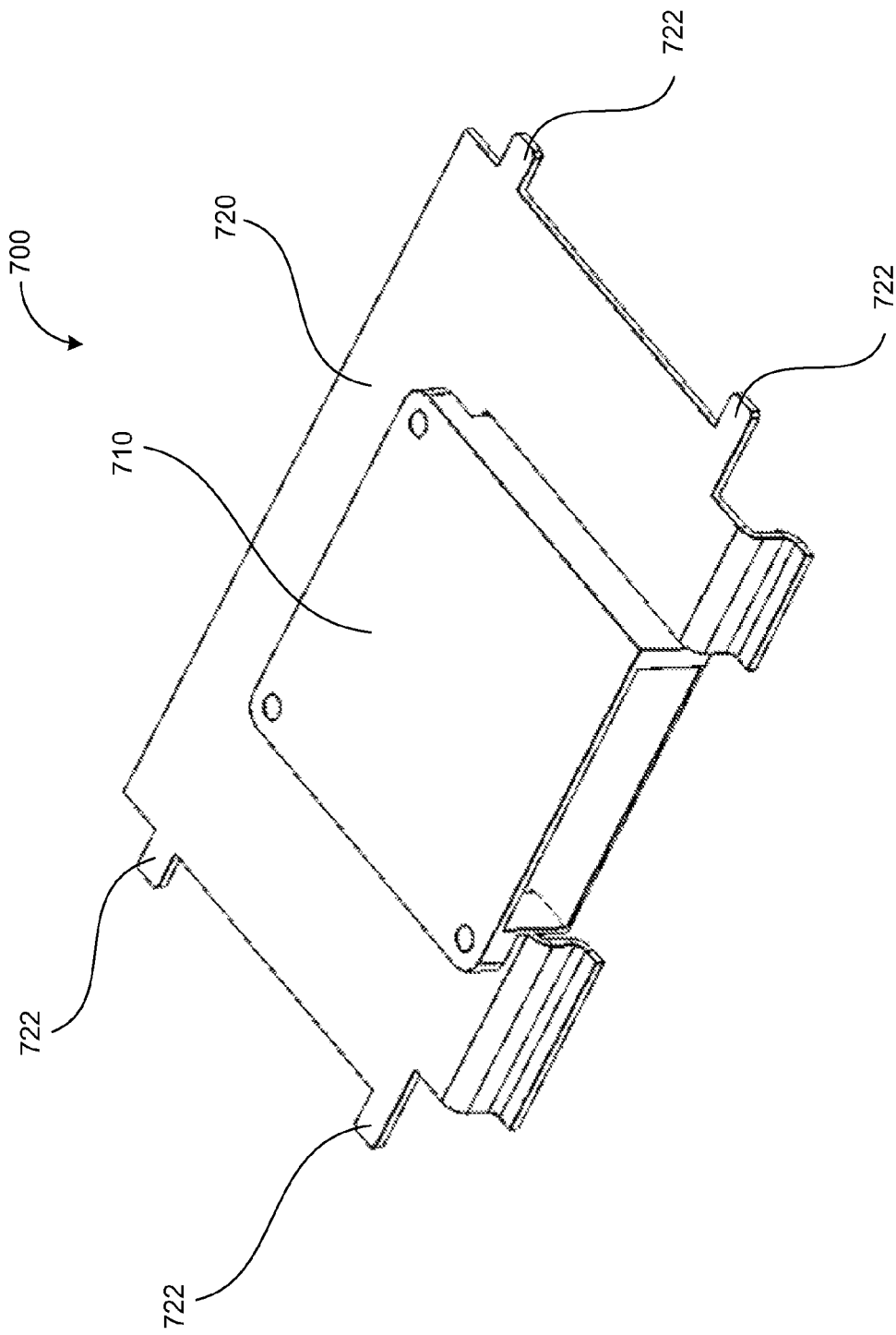

As shown in FIGS. 18A and 18B, each of the air mover assemblies 700 includes an air mover 710 (e.g., a blower) and mounting plate 720 that supports the air mover 710. The air mover assemblies 700 are arranged to convey an air flow through the test compartment 560 of the associated test slot 500, e.g., for convective cooling of a storage device 600 disposed within the test compartment 560. In this regard, the air mover 710 is arranged to draw an air flow in through air entrances 417 (FIGS. 7A and 7B) in the face plate 412 of the storage device transporter 400 and exhaust the air flow through the rectangular openings 135 in the back wall portion 118 (FIG. 11A) of the test slot carrier 110.

The air mover 710 can be electrically connected to the connection interface board 570 (FIG. 16) of the associated test slot 500 for communication with the test electronics 160. A suitable blower is available from Delta Electronics, Inc., model number BFB04512HHA.

The mounting plate 720 includes a plurality of projections 722. The projections 722 interface with the second grommets 134 in the body 112 (FIG. 10) and thereby help to support the air mover assemblies 700 within the body 112. More specifically, when assembled with the body 112, the projections 722 each sit within a hole 155 (FIG. 10) in a corresponding one of the second grommets 134. The second grommets 134 being formed of a mechanical vibration isolating material, inhibit the transmission of vibrations between the air mover assemblies 700 and the body 112.

Different ones of the test slot assemblies 120 can be configured for testing different types of storage devices (e.g., 69.85 mm×7-15 mm×100 mm disk drives), and the different test slot assemblies 120 can be arranged in corresponding ones of the test slot carriers 110 such that each of the test slot carriers 110 supports associated test slot assemblies 120 that are configured to test a particular type of storage device. For example, in some embodiments, each of the individual test slot carriers 110 is configured to test either a 7 mm disk drive, 9.5 mm disk drives, 12 mm disk drives, or 15 mm disk drives. The test slot carriers 110 that are configured to test 9.5 mm disk drives can include a total of 14 test slot assemblies 120 (per carrier), each of the associate test slot assemblies 120 being configured to test a 9.5 mm disk drive. The test slot carriers 120 that are configured to test 12 mm disk drives can include a total of 12 test slot assemblies 120 (per carrier), each of the associate test slot assemblies 120 being configured to test a 12 mm disk drive. The test slot carriers 120 that are configured to test 15 mm disk drives can include a total of 7 test slot assemblies 120 (per carrier), each of the associate test slot assemblies 120 being configured to test a 15 mm disk drive.

The individual test slot assemblies 120 may have different dimensions depending on the particular type of storage device they are configured to test. However, regardless of which type of the test slot assemblies 120 the individual test slot carriers 110 support, all of the test slot carriers 110 can have the same overall dimensions and are configured to be interchangeable with each other among the many carrier receptacles 110 of the test racks 100 allowing for adaptation and/or customization of the testing system 10 based on testing needs.

In some embodiments, individual test slots 500 can be used to test different types of storage devices. In some cases, for example, test slots 500 that are configured to test taller storage devices can also be used to test shorter storage devices. As an example, a test slot 500 configured to test 15 mm disk drives may also be used to test 12 mm, 9.5 mm, and/or 7 mm disk drives.

Other details and features combinable with those described herein may be found in the following U.S. patent application filed Jul. 15, 2009, entitled "CONDUCTIVE TEMPERATURE SENSING," inventors: Brian S. Merrow et al., and having assigned Ser. No. 12/503,687. Other details and features combinable with those described herein may also be found in the following U.S. patent application filed concurrently herewith, entitled "STORAGE DEVICE TESTING SYSTEM COOLING," inventor: Brian S. Merrow, and having assigned Ser. No. 12/698,575. The entire contents of all of the aforementioned patent applications are hereby incorporated by reference.

A number of implementations have been described. Nevertheless, it will be understood that various modifications may be made without departing from the spirit and scope of the disclosure. For example, the protrusions on the test slots that interface with the isolators in the body could be embodied as protrusions on the body that interface with isolators on the test slots. Accordingly, other implementations are within the scope of the following claims.

What is claimed is:

1. A test rack comprising:
 a plurality of test slot carriers, each of the test slot carriers comprising:
  a plurality of test slot assemblies configured to receive and support storage devices for testing; and
 a chassis comprising a plurality of carrier receptacles for releasably receiving and supporting the test slot carriers, wherein the test slot carriers are interchangeable with each other among the carrier receptacles.

2. The test rack of claim 1, wherein the test rack infrastructure for setting and maintaining temperatures is not dependent upon a test slot pitch or a test slot type associated with the respective test slot carriers.

3. The test rack of claim 1, further comprising test electronics configured to communicate one or more test routines to storage devices disposed within the test slot assemblies.

4. The test rack of claim 3, wherein the test slot assemblies comprise connection interface boards configured to provide electrical communication between storage devices disposed within the test slot assemblies and the test electronics.

5. The test rack of claim 1, wherein the test slot assemblies are each supported in an associated one of the test slot carriers via isolators, wherein the isolators are arranged to inhibit transmission of vibrational energy between the test slot assemblies and the associated one of the test slot carriers.

6. The test rack of claim 1, wherein at least one of the test slot assemblies is configured to test different types of storage devices.

7. The test rack of claim 1, wherein at least one of the test slot assemblies is configured to test two or more types of storage devices selected from the group consisting of: a 7 mm disk drive, a 9.5 mm disk drive, a 12 mm disk drive, and a 15 mm disk drive.

8. The test rack of claim 1,
 wherein the plurality of test slot carriers comprise:
  a first test slot carrier comprising a first plurality of test slot assemblies; and
  a second test slot carrier comprising a second plurality of test slot assemblies, and
 wherein the first plurality of test slot assemblies are configured to test a first type of storage device, and wherein the second plurality of test slot assemblies are configured to test a second type of storage device different from the first type of storage device.

9. The test rack of claim 8, wherein the first type of storage device is selected from the group consisting of: a 7 mm disk drive, a 9.5 mm disk drive, a 12 mm disk drive, and a 15 mm disk drive.

10. The test rack of claim 8, wherein the second type of storage device is selected from the group consisting of: a 7 mm disk drive, a 9.5 mm disk drive, a 12 mm disk drive, and a 15 mm disk drive.

11. The test rack of claim 1, wherein each of the test slot assemblies comprises:
 an air mover assembly arranged to convey an air flow through the associated test slot assembly.

12. The test rack of claim 11, wherein the air mover assemblies are each supported in an associated one of the test slot carriers via isolators, wherein the isolators are arranged to inhibit transmission of vibrational energy between the air mover assemblies and the associated one of the test slot carriers.

13. The test rack of claim 1, wherein each of the test slot carriers comprises:
 at least one air mover assembly arranged to convey an air flow through at least one of the associated test slot assemblies.

14. A test slot carrier comprising:
 a body, configured to be releasably received by a carrier receptacle in a chassis;
 a plurality of test slot assemblies supported by the body, the test slot assemblies being configured to receive and support storage devices for testing;
 a plurality of first isolators arranged to inhibit transmission of vibrational energy between the test slot assemblies and the body.

15. The test slot carrier of claim 14,
wherein each of the test slot assemblies comprises:
- a storage device transporter comprising a frame configured to receive and support a storage device; and
- a test slot including a test compartment for receiving and supporting the storage device transporter.

16. The test slot carrier of claim 15, wherein the test slots include protrusions which interface with the first isolators.

17. The test slot carrier of claim 15, wherein the carrier body includes protrusions which interface with the first isolators.

18. The test slot carrier of claim 15, wherein the test slot carrier further comprises:
- at least one air mover assembly arranged to convey an air flow through at least one of the test compartments of the associated test slots.

19. The test slot carrier of claim 15, wherein the test slot carrier further comprises:
- at least one air mover assembly arranged to convey an air flow through at least one of the test compartments of the associated test slots; and
- one or more second isolators arranged to inhibit transmission of vibrational energy between the air mover assembly and the body.

20. The test slot carrier of claim 15, wherein the test slot carrier further comprises:
- an air mover; and
- a mounting plate supporting the air mover, wherein the mounting plate includes projections which interface with the second isolators.

21. A method comprising:
- inserting a first test slot carrier comprising a first plurality of test slots into a carrier receptacle of a test rack;
- removing the first test slot carrier from the carrier receptacle; and
- inserting a second test slot carrier comprising a second plurality of test slots into the carrier receptacle.

22. The method of claim 21, further comprising utilizing one of the first plurality of test slots to perform a functionality test on a first storage device while the first test slot carrier is disposed within the carrier receptacle.

23. The method of claim 21, further comprising utilizing one of the second plurality of test slots to perform a functionality test on a second storage device while the second test slot carrier is disposed within the carrier receptacle.

24. The method of claim 21, further comprising inserting the first test slot carrier into an other carrier receptacle of the test rack.

25. The method of claim 21, further comprising inserting the first test slot carrier into an other carrier receptacle of an other test rack.

26. The method of claim 21, wherein the first plurality of test slot assemblies are configured to test a first type of storage device, and wherein the second plurality of test slot assemblies are configured to test a second type of storage device, different from the first type of storage device.

* * * * *